United States Patent
Behr et al.

(10) Patent No.: US 9,348,889 B2
(45) Date of Patent: May 24, 2016

(54) REQUIREMENTS FRAMEWORK

(71) Applicant: The MathWorks, Inc., Natick, MA (US)

(72) Inventors: Matthew B. Behr, Brooklyn, NY (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/588,009

(22) Filed: Dec. 31, 2014

(65) Prior Publication Data

US 2015/0113020 A1    Apr. 23, 2015

Related U.S. Application Data

(63) Continuation of application No. 13/242,634, filed on Sep. 23, 2011, now Pat. No. 8,943,470.

(51) Int. Cl.
*G06F 9/44* (2006.01)
*G06F 9/45* (2006.01)
*G06F 17/30* (2006.01)

(52) U.S. Cl.
CPC ............ *G06F 17/30607* (2013.01); *G06F 8/10* (2013.01); *G06F 17/30289* (2013.01)

(58) Field of Classification Search
CPC ............... G06F 8/10; G06F 8/35; G06F 8/73; G06F 8/20; G06F 8/30; G06F 8/24; G06F 17/30607; G06F 17/30371; G06F 8/61; G06F 8/65; G06F 8/71
See application file for complete search history.

(56) References Cited

U.S. PATENT DOCUMENTS

| | | | |
|---|---|---|---|
| 6,742,175 B1 * | 5/2004 | Brassard | G06F 8/71 717/107 |
| 6,845,503 B1 * | 1/2005 | Carlson | G06F 8/65 717/166 |
| 6,865,730 B1 | 3/2005 | Burke et al. | |
| 6,996,813 B1 | 2/2006 | Sokolov et al. | |
| 7,269,592 B2 * | 9/2007 | Angele | G06F 17/30607 707/769 |
| 7,316,002 B1 | 1/2008 | Armand et al. | |
| 7,543,272 B1 | 6/2009 | Kline | |
| 7,761,848 B1 | 7/2010 | Chaffin | |
| 7,941,438 B2 * | 5/2011 | Molina-Moreno | G06F 8/35 707/756 |
| 7,962,888 B2 | 6/2011 | Rojer | |

(Continued)

FOREIGN PATENT DOCUMENTS

WO    WO 2008/124038 A1    10/2008
WO    WO 2011/031328 A2    3/2011

OTHER PUBLICATIONS

The MathWorks, Inc., Matlab 7 Objected-Oriented Programming, published 2008, 369 pages.*

(Continued)

*Primary Examiner* — Thuy Dao
(74) *Attorney, Agent, or Firm* — Harrity & Harrity, LLP

(57) ABSTRACT

A computing device may be configured to interact with a requirement object using an object-based requirements framework. The computing device may further provide a design to the object-based requirements framework. The design may comply with design criteria of the object-based requirements framework. The computing device may also determine whether the design complies with the requirement object. The determining may be based on the interacting, and may produce a result.

20 Claims, 17 Drawing Sheets

(56) References Cited

U.S. PATENT DOCUMENTS

| | | | |
|---|---|---|---|
| 8,365,138 B2 * | 1/2013 | Iborra | G06F 8/30 717/104 |
| 8,375,355 B2 | 2/2013 | Mercer et al. | |
| 8,615,734 B2 | 12/2013 | Susaria et al. | |
| 2003/0115487 A1 | 6/2003 | Andrews et al. | |
| 2007/0006203 A1 | 1/2007 | Marwinski | |
| 2007/0038977 A1 | 2/2007 | Savage | |
| 2007/0288892 A1 * | 12/2007 | Foti | 717/114 |
| 2008/0092111 A1 * | 4/2008 | Kinnucan | G06F 8/10 717/105 |
| 2010/0275181 A1 | 10/2010 | Mercer et al. | |
| 2011/0088011 A1 * | 4/2011 | Ouali | G06F 8/10 717/105 |
| 2012/0266159 A1 * | 10/2012 | Risbood | G06F 8/61 717/177 |
| 2013/0080130 A1 | 3/2013 | Behr et al. | |

OTHER PUBLICATIONS

B. Pientka, A type-theoretic foundation for programming with higher-order abstract syntax and first-class substitutions, Jan. 2008, 12 pages.*

MathWorks, Matlab Primer, 2015, 204 pages.*

Hongchao JI et al., "A Model Driven Approach for Requirements Engineering of Industrial Automation Systems", EOOLT 2011—4$^{th}$ International Workshop on Equation-Based Object-Oriented Modeling Languages and Tools, Sep. 2011, pp. 9-18.

Notification of Transmittal of the International Search Report and the Written Opinion of the International Searching Authority, or the Declaration corresponding to PCT/US2012/053490, mailed Dec. 6, 2012, 11 pages.

Vinita et al., "On reverse engineering an object-oriented code into UML class diagrams incorporating extensible mechanisms", Aug. 2008, 9 pages.

Lee et al., "Classes and inheritance in actor-oriented design", Jul. 2009, 26 pages.

* cited by examiner

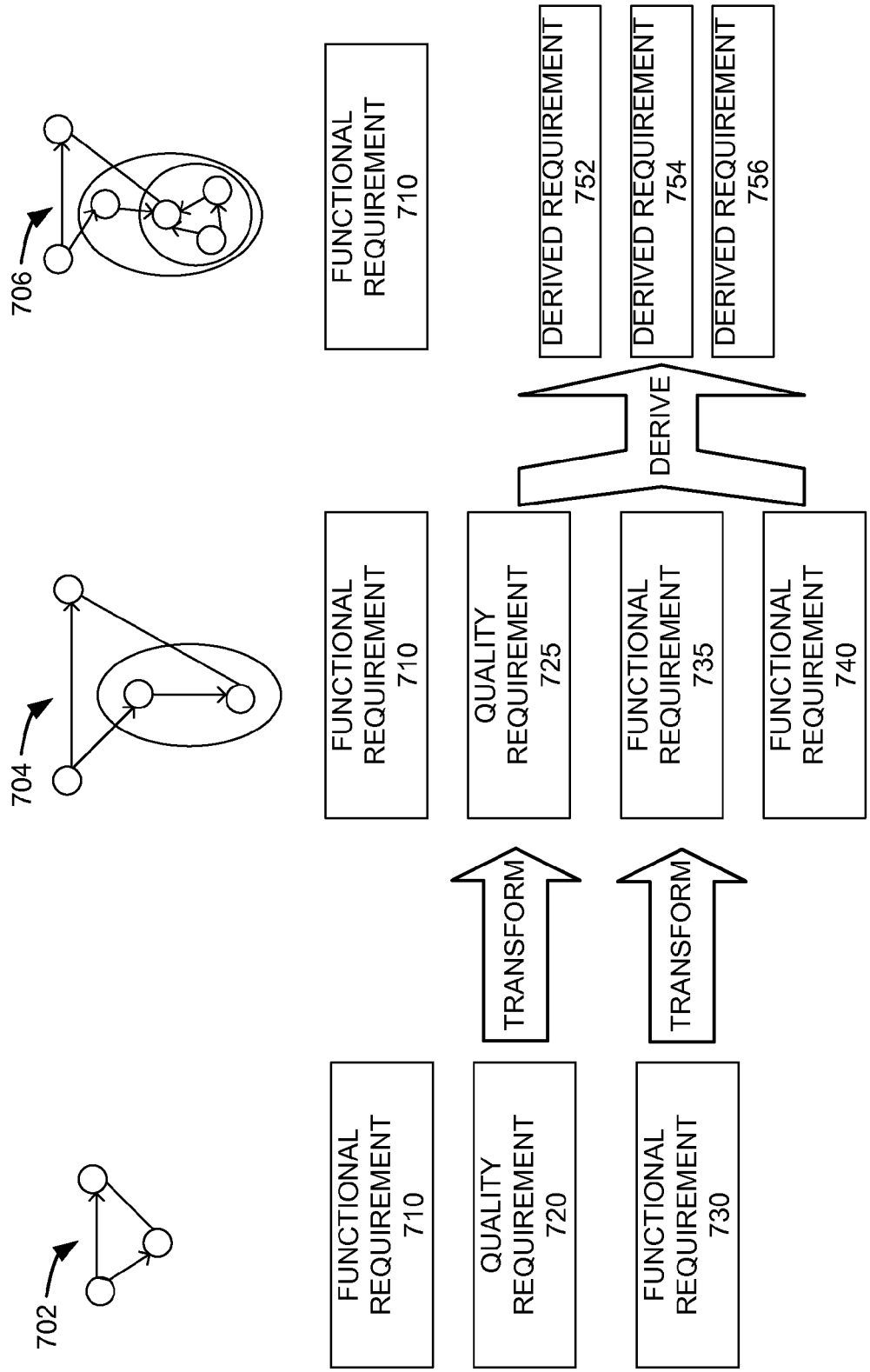

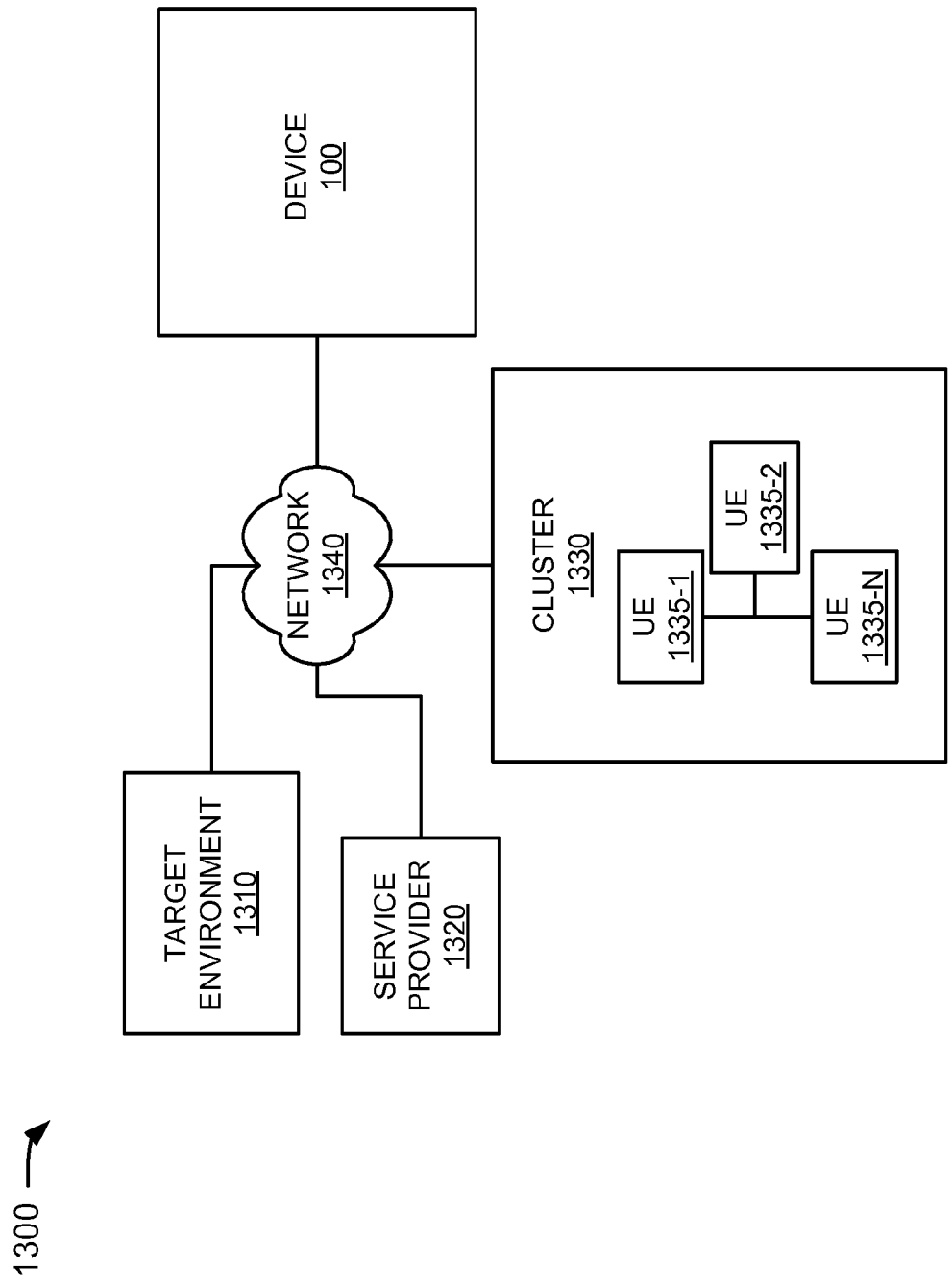

REQUIREMENTS FRAMEWORK

RELATED APPLICATION

This application is a continuation of U.S. patent application Ser. No. 13/242,634, filed Aug. Sep. 23, 2011 (now U.S. Pat. No. 8,943,470), which is incorporated herein by reference.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 7A illustrates an example of transforming a design and requirements associated with the design;

FIG. 13 is a diagram of an example distributed network in which systems and/or methods described herein may be implemented.

DETAILED DESCRIPTION

Figure 1:
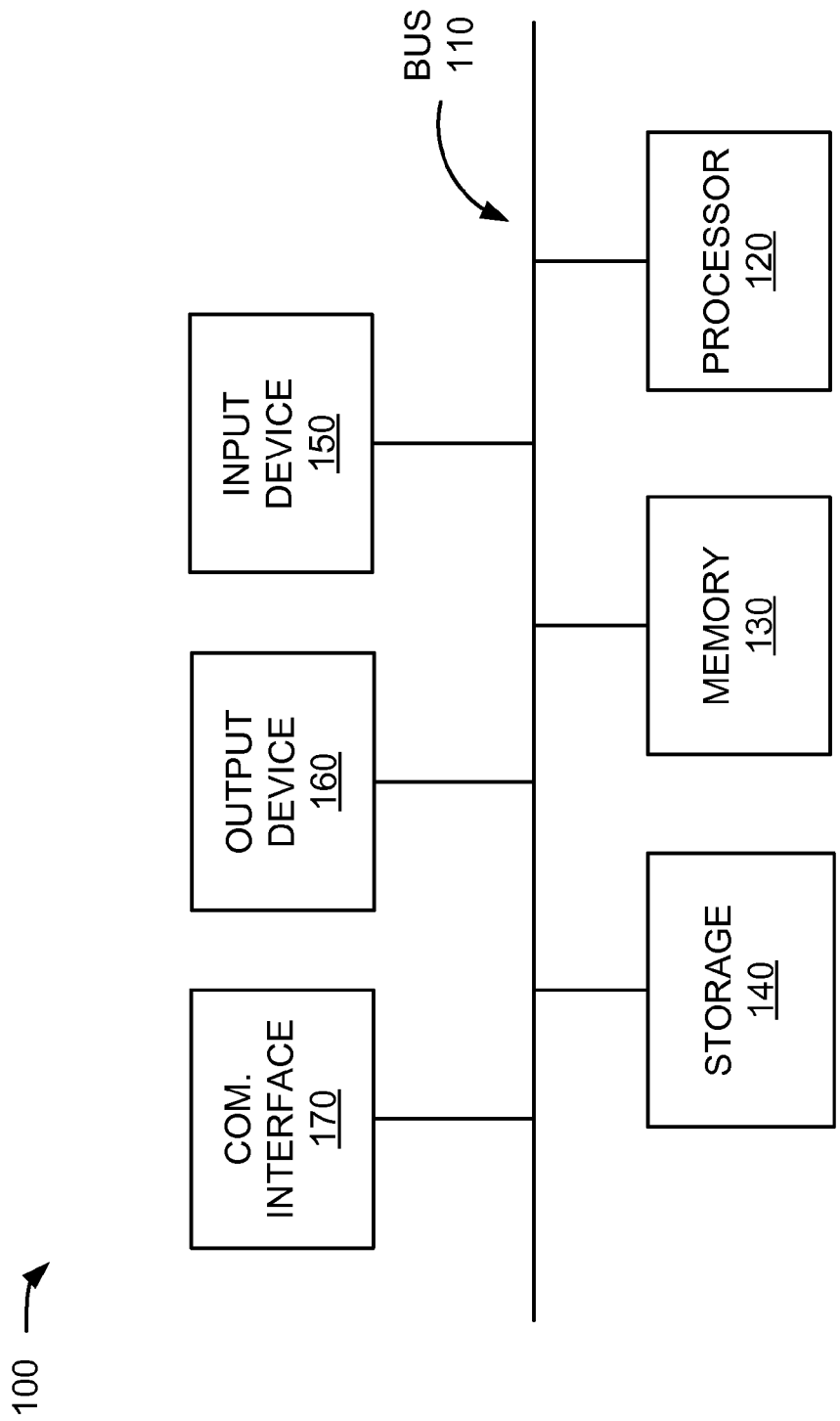
FIG. 1 is a diagram of an example computing device that may implement one or more embodiments of the invention.

The following detailed description refers to the accompanying drawings. The same reference numbers in different drawings may identify the same or similar elements.

A design may include a representation of a system and/or software. The design may include one or more of: a graphical model, a textual model, a time-based modeling diagram, a class diagram, an object diagram, a state transition diagram, a unified modeling language (UML) diagram, an architecture description language (ADL) diagram, hardware code, software code, differential equations, difference equations, algebraic equations, assignments, a collection of data, etc.

A design may include one or more elements. An element may represent a portion of the design. A computer device may execute, implement, and/or utilize the design to simulate the system.

Different types of designs may represent different portions/aspects of systems. For example, a quality design may include elements related to reliability of a design. An architectural design may include elements related to an organization and/or a structure of a system (e.g., a computer architecture, a software architecture, a system architecture).

A requirement may represent/specify, for example, an attribute, a capability, a characteristic, and/or a quality that a design is required to possess. A requirement may refer to a requirement object or a requirement element corresponding to the requirement. A requirement element may include a requirement object and/or one or more other types of data structures. Any reference below to a requirement, to a requirement object, and/or to a requirement element may be applicable to a collection of requirements, to a collection of requirement objects associated with the requirements, and/or to a collection of requirement elements associated with the requirements.

An entity may require a design to comply with one or more applicable requirements before the design is utilized for one or more functions. The entity may include a user, a developer, a client, an organization, etc. The entity may use a requirement object corresponding to a requirement to determine whether a design satisfies the requirement.

An entity may organize one or more requirements into collections of requirements. A collection of requirements may refer to a set of requirements, an array of requirements, a linked list of requirements, a dictionary of requirements, a vector of requirements, a matrix of requirements, and/or any other grouping of (e.g., a data structure that includes) one or more requirements. A collection of requirements may also refer to a collection of requirement elements associated with requirements and/or to a collection of requirement objects associated with requirements. A collection of requirements may be heterogonous. For example, an array of requirements may include requirement objects of different types. An entity and/or a framework may organize the one or more requirements into a collection of requirements based on a use of the requirements, a type of the requirements, version(s) of the requirements, and/or based one or more other factors. The use of the requirements may include a type of design (e.g., a dynamic model, a computational model, a behavioral design, an architectural design) to which the requirements in the collection are applicable and/or a type of system (e.g., manufacturing machinery) represented by the design. The other factors may include, for example, personal preferences of the user.

Overview

An embodiment may provide a requirements framework for determining whether a design satisfies requirements. A user may use object-oriented programming techniques and concepts to create requirement elements. Each one of the requirement elements may represent a requirement. The framework may receive the requirement elements and the design. The framework may manipulate the requirement elements to meet requirement element criteria specified by a requirements framework component of the framework. The framework may determine whether requirement elements are applicable to a design. The framework may select requirement objects that are applicable to the design. The framework may determine whether the design satisfies requirements associated with (e.g., corresponding to) the selected requirement objects. The framework may further determine whether requirement elements are applicable to an implementation of a design and/or to data stored in a data structure. The framework may determine whether the implementation and/or the data satisfies the requirements elements.

Example Components of a Device

FIG. 1 is a diagram of example components of a device 100 that may implement embodiments described below. Device 100 may include a computational device. For example, device 100 may include a server, a workstation, a mainframe, a desktop computer, a laptop computer, a smart phone, a tablet computer, and/or some other type of computational device.

Referring to FIG. 1, device 100 may include, among other things, a bus 110, a processor 120, a memory 130, a storage 140, an input device 150, an output device 160, and/or a communication interface 170. In other implementations, device 100 may include fewer components, additional components, different components, and/or a different arrangement of components than those depicted in FIG. 1.

Bus 110 may permit communication between components of device 100. Bus 110 may include a system bus, an address bus, a data bus, and/or a control bus. Bus 110 may also include bus drivers, bus arbiters, bus interfaces, and/or clocks.

Processor 120 may interpret and/or execute instructions. For example, processor 120 may include one or more general-purpose processors, microprocessors, data processors, graphical processing units (GPUs), co-processors, network processors, application specific integrated circuits (ASICs), application specific instruction-set processors (ASIPs), system-on-chip (SOC), controllers, programmable logic devices (PLDs), chipsets, and/or field programmable gate arrays (FPGAs).

Memory 130 may be a non-transitory tangible computer-readable storage medium that may store data and/or instructions related to an operation and use of device 100. For example, memory 130 may store data and/or instructions that may implement one or more embodiments described herein. Memory 130 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 140 may include a non-transitory tangible computer-readable storage medium that may store data and/or software related to operation and use of device 100. For example, storage 140 may include a hard disk (e.g., a magnetic disk, an optical disk, a magneto-optic disk, a solid state disk), a floppy disk, a cartridge, a magnetic tape, and/or other types of non-transitory tangible computer-readable storage mediums. Moreover, storage 140 may include a drive that may hold the medium. For example, storage 140 may include a compact disc and a compact disk drive that may be used to read/write the compact disc.

It should be noted that a computer-readable medium is intended to be broadly interpreted to include a memory, storage, or other computer-readable mediums. A computer-readable medium may be tangible and may be implemented in a single device, in multiple devices, in a centralized manner, or in a distributed manner. A computer-readable medium may correspond to, for example, a physical device or a logical device that may store computer-executable instructions for performing one or more activities on a computing device and/or that may store data that may be manipulated by a computing device. A logical device may be a device that may include storage within a single physical device or storage that may be spread across multiple physical devices. Examples of logical devices may include, but are not limited to, virtual drives and virtual memory. The computer-readable medium may store data and/or instructions that may implement one or more embodiments of the invention.

Memory 130 and/or storage 140 may also include a storage device external to and/or removable from device 100, such as a Universal Serial Bus (USB) memory stick, a hard disk, network storage, or other storage devices.

Input device 150 may permit information to be input into device 100. Input device 150 may include, for example, a keyboard, a keypad, a mouse, a display (e.g., a touch screen), a button, a switch, a microphone, voice recognition logic, a camera, a gyroscope, an accelerometer, a global positioning system (GPS), an input port, and/or some other type of input device. Output device 160 may permit information to be output from device 100. Output device 160 may include, for example, a display, a speaker, one or more light emitting diodes (LEDs), an output port, and/or some other output device.

Communication interface 170 may permit device 100 to communicate with other devices, networks (e.g., a local area network, wide area network, the Internet, etc.), and/or systems. Communication interface 170 may include a transceiver-like component that enables communication with the other devices. Examples of communication interface 170 may include a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the device 100 to a network.

As will be described in detail below, device 100 may perform certain acts relating to embodiments described herein. Device 100 may perform these acts in response to processor 120 executing software instructions contained in a computer-readable medium, such as memory 130 and/or storage 140. The software instructions may be read into memory 130 from another computer-readable medium, such as storage 140, or from another device via communication interface 170. The software instructions contained in memory 130 may cause processor 120 to perform acts described herein. Alternatively, hardwired circuitry may be used in place of or in combination with software instructions to implement acts described herein. Thus, embodiments described herein are not limited to any specific combination of hardware circuitry and software.

Example Requirements Framework

Figure 2:
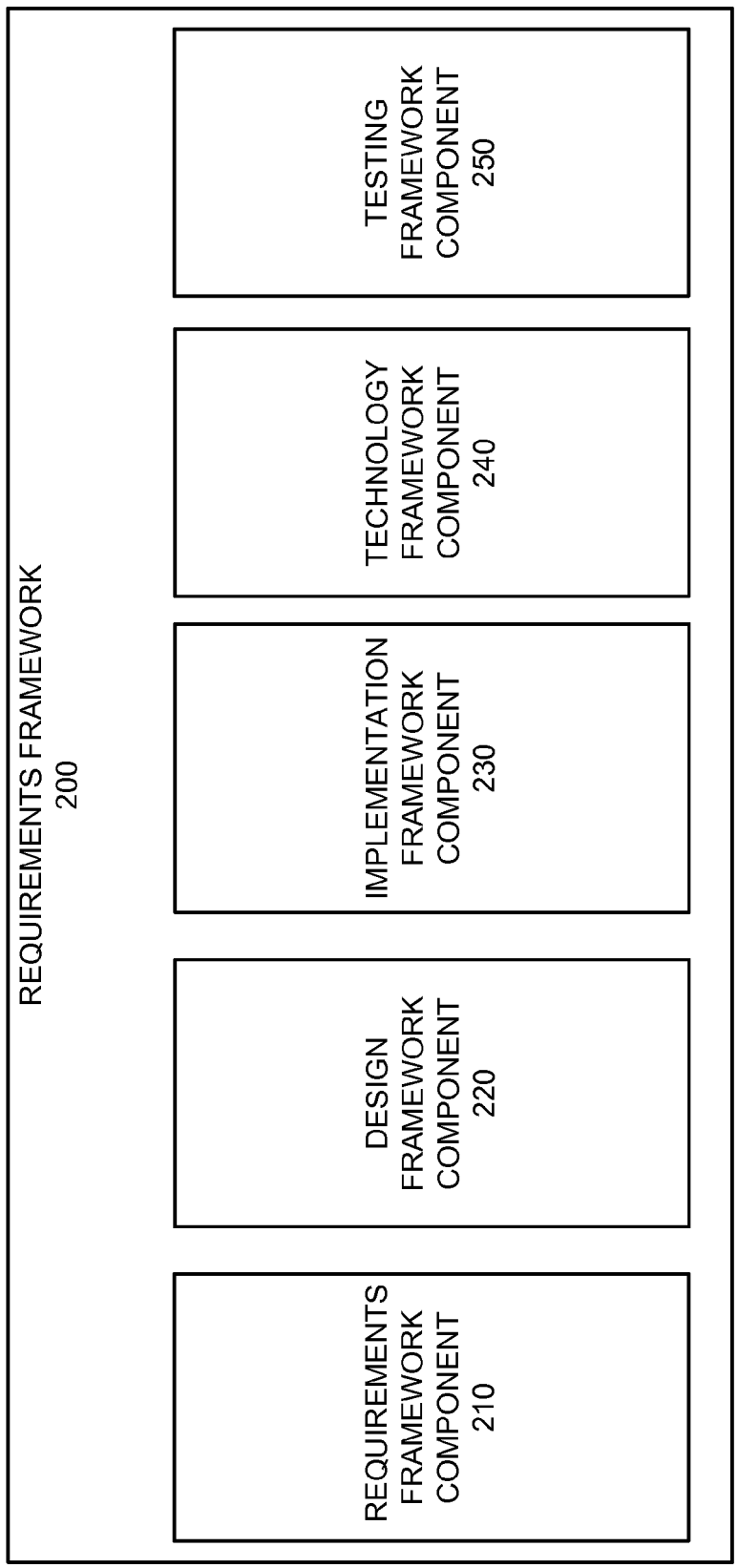
FIG. 2 is a diagram illustrating an example framework.

FIG. 2 is a diagram illustrating an example requirements framework 200. In one implementation, storage 140 may store requirements framework 200.

Requirements framework 200 may receive a requirement element and a design. Requirements framework 200 and/or the requirements element may determine whether the requirement element complies with requirement element criteria. The requirement element criteria may specify which properties and/or functionalities the requirement element must include. Requirements framework 200 and/or the requirements element use invocation criteria. The invocation criteria may specify which applicability criteria, of the requirement element, should be used to assess whether the requirement element is applicable to the design. Requirements framework 200 and/or the requirement element may use the applicability criteria. The applicability criteria may specify whether the requirement element is applicable to the design. Requirements framework 200 and/or the requirement element may further determine whether the design satisfies a requirement associated with the requirement element. In another implementation, requirements framework 200 may receive the requirement element as part of a collection of requirement elements (e.g., an array of requirement elements). The aforementioned process may occur in relation to each one of the other requirement elements of the collection of requirement elements.

Requirements framework 200 may include a requirements framework component 210, a design framework component 220, an implementation framework component 230, a technology framework component 240, and a testing framework component 250. In practice, requirements framework 200 may include additional components, fewer components, and/or different components than those shown in FIG. 2. For example, framework 200 may only include requirements framework component 210 and design framework component 220.

Requirements framework component 210 may receive and/or store requirements information associated with requirement objects. The requirements information may include, for example, requirement element criteria, invocation criteria, and applicability criteria. The requirement element criteria may specify one or more functionalities (e.g., methods) and/or one or more properties that a requirement object must include. The invocation criteria may specify which applicability criteria of the requirements framework and/or of the requirement element are active. The applicability criteria may specify when a requirement object is applicable to a particular design. Requirements framework component 210 may apply different requirement element criteria, invocation criteria, and/or applicability criteria based on a particular type of a requirement corresponding to the requirement object, as described further below in reference to FIG. 3.

In another implementation, requirement framework component 210 may store information about optional characteristics of requirement objects. For example, the information about optional characteristics may specify one or more optional functionalities and/or one or more optional properties that a requirement object is allowed to include but is not required to include in order to comply with requirement element criteria. The one or more optional functionalities and/or the one or more optional properties may comply with criteria of requirements framework 200. The information about optional characteristics may specify the criteria for the optional functionalities and/or the optional characteristics. Requirements framework 200 may invoke the one or more optional functionalities and/or the one or more optional properties.

In yet another implementation, requirement objects may include one or more functionalities and/or one or more properties with access restrictions (e.g., public, private, protected). For example, a functionality with a private access restriction may not be accessible (e.g., invoked) by the requirements framework or other requirement objects.

Additionally, or alternatively, requirements information may include rules for conducting operations on/with requirement objects and/or collections of requirement objects, as described further below in reference to FIGS. 7A and 10-12. Conducting an operation with requirement objects may include, for example, adding a first requirement object to a second requirement object in order to create a new requirement object. The rules may specify, for example, which methods and/or properties of the first requirement object and the second requirement object are to be included in the new requirement object. Conducting an operation with collections of requirement objects may include, for example, adding a first collection of requirement objects and/or a requirement object to a second collection of requirement objects in order to create a new collection of requirement objects. The rules may specify, for example, which requirement objects are included in the new collection of requirement objects.

Design framework component 220 may receive and/or store design information associated with designs. The design information may include design criteria. The design criteria may specify characteristics of a design. The design criteria may vary based on a type of the design (e.g., a functional design, an architectural design). In one example, the design information may include a list of allowed programming languages. When a design includes software code, the design criteria may, for example, require the software code to be in one of the programming languages included in the list of allowed programming languages.

In another example, the design information may include a list of one or more allowed graphical model elements (e.g., a product block, a sum block, a time delay block, a sampled data signal, a continuous-time integrator block, a bus creator block, a bus signal, a subsystem block, a state transition chart block, a function-call signal, a substrate block, a control junction block, a rigid body block, a rotational joint block, a prismatic joint block, a local solver block, an electrical resistor block, an electrical capacitor block, an electrical transistor block, an electrical ground block, an annotation element, etc.). When a design includes a graphical model, the design criteria may, for example, require the graphical model to only use graphical model elements in the list of allowed graphical model elements. The design criteria may also vary based on one or more type(s) of requirements that are applicable to a particular design.

Requirements framework 200 and/or another entity may associate requirement object(s) with element(s) of a design. For example, a requirement object may include an identifier that corresponds to an annotation of element(s) of a design. Requirements framework 200 may query the design to return the annotations of some or all elements of the design. Requirements framework 200 may then associate the requirement object with one or more of the elements with annotations that corresponds to the identifier. Additionally, or alternatively, requirements framework 200 may parse at least part of the design to determine which requirement object to associate with which element of the design.

An element of a design may include one or more of an entity (e.g., a block, a state, a component, an object, a class, a system, or a subsystem), a relation (e.g., a line, a signal, a bus, a transition, a life line, a method call, an association, an aggregation, an inheritance, or a channel), a parameter, a variable, a configuration (e.g., a hardware target, an optimization, a diagnostic, or a solver), a hierarchical layer, a workspace, etc. Requirements framework 200 and/or a requirement object may associate the requirement object with the element of the design based on one or more of an annotation, a name, a tag, a type, an identifier, a label, a checksum, a reference, a link, etc. of the requirement object and/or of the design element. The association may result in an active link (e.g., a hyperlink) from the element of the design to the requirement object and/or from the requirement object to the element of the design. Multiple requirement objects may be associated with one design element. Multiple design elements may be associated with one requirement object.

Requirements framework 200 and/or another entity may scope an association of a requirement object with a design element. For example, requirements framework 200 may store a requirement object in a workspace of a hierarchical layer of a design. An identifier of the requirement object may associate the requirement object with design elements, of the design, in the hierarchical layer. A different requirement object, with the same identifier but stored in a different workspace of a different hierarchical layer of the design may associate the different requirement object with different design elements in the different hierarchical layer.

The design information may also include rules for modifying (e.g., simplifying) a design based on requirements that are applicable to the design. For example, a rule may eliminate any explicit inclusion (e.g., representation) of an element that does not include any other elements and is not related to any one of the requirements applicable to the design. An example is illustrated below in reference to FIGS. 6B and 6C.

Implementation framework component 230 may store implementation information associated with implementing designs. The implementation information may include implementation criteria (e.g., whether to use global variables, whether to use references such as pointers, whether to use recursion, etc.). Requirements framework 200 may execute/implement a design by using a particular technology (e.g., a personal computer, a microprocessor, an operating system, or a middleware) specified by the implementation criteria. An implementation may include code, such as programming code and/or hardware description language (HDL) code.

Technology framework component 240 may store technology information associated with implementations of designs. The technology information may include technology criteria. The technology criteria may specify target technology to use to execute/implement a design, for example, during testing of the design (e.g., before determining whether the design satisfies a requirement) and/or implementations of the design. For example, the technology information may specify a particular type of computing platform (e.g., a personal computer platform with a particular type of processor, a particular semiconductor technology such as complementary metal-oxide-semiconductor (CMOS), a particular compiler) for testing a particular type of design (e.g., a graphical model of an architectural design) and/or implementation associated with the design. Requirements framework 200 may use the particular type of computing platform to test the design and/or the implementation.

Testing framework component 250 may store testing information associated with testing whether design(s) and/or implementations of the designs satisfy requirements by using requirement objects, corresponding to the requirements, which are applicable to the design(s) and/or the implementation(s). The testing information may specify how to test whether a particular design and/or an implementation of the particular design satisfies the requirements. For example, the testing information may specify that when testing a particular (type of) design that includes a graphical model, requirements framework 200 is to compile the design, execute the design, and store an output of the execution in a particular storage. Additionally, or alternatively, testing information may specify a data structure and/or identifiers for storing the output of the execution. Requirements framework 200 may create a data structure during testing of the design. A verifying functionality of a requirement object may access the created data structure to determine whether the design satisfies a requirement associated with the requirement object. In another implementation, testing framework component 250 may also store applicability criteria and/or invocation criteria, described above with reference to requirements framework component 210.

Traceability may exist between designs and implementations of the designs. Requirements framework 200 may use the traceability to associate a requirement element with an element of an implementation based on an element of a design with which the requirement element is associated via the traceability. Requirements framework 200 may store, in the requirement element, information about the association of the element of the implementation with the requirement element. Thereafter, requirements framework 200 may determine the element of the implementation that is associated with the requirement element based on the stored information.

Requirements framework 200 and/or the requirement element may determine the association of a requirement element with an implementation element, based on properties and functionality of the requirement element, by using and by not using the traceability between design(s) and implementation(s) of the design(s). For example, requirements framework 200 may establish a first determination by using the traceability and a second determination by not using the traceability. Requirements framework 200 may assess the first determination and the second determination by, for example, determining whether consistency exists between the two determinations. Requirements framework 200 may determine that consistency exists between the two determinations when both of the two determinations associate the requirement element with the same implementation element.

Example Requirements Framework Component

Figure 3:
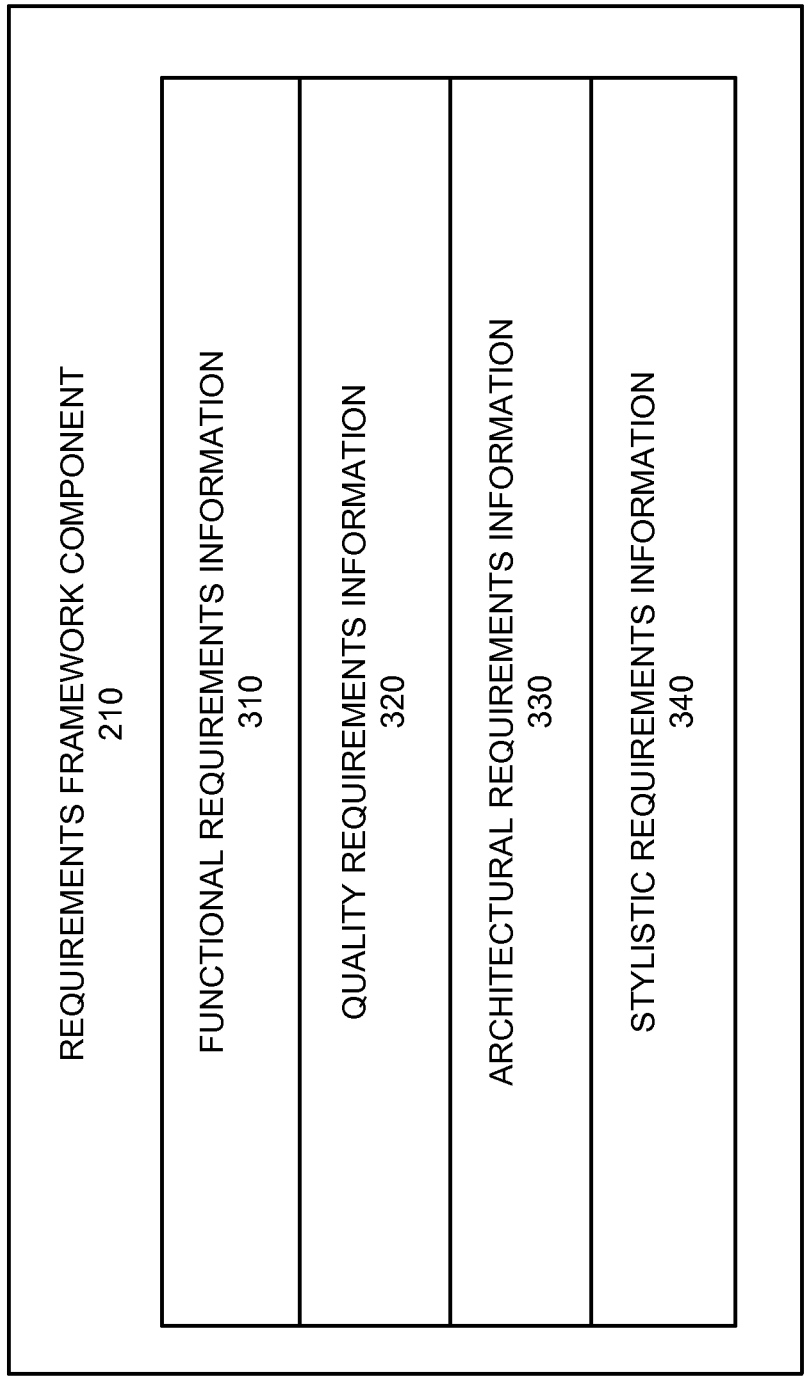
FIG. 3 is a diagram illustrating an example requirements framework component of the framework of FIG. 2.

FIG. 3 is a diagram illustrating an example requirements framework component 210. As shown, requirements framework component 210 may include functional requirements information 310, quality requirements information 320, architectural requirements information 330, and stylistic requirements information 340. In practice, requirements framework component 210 may include additional information, fewer information, or different information than shown in FIG. 3.

Functional requirements information 310 may include criteria for requirement objects, corresponding to functional requirements, used to assess behavior of a system represented by a design. For example, requirements framework 200 may receive a requirement object used to determine that a camera of a system captures images with a particular resolution (e.g., 200×400 pixels). Requirements framework 200 may use functional requirements information 310 to determine whether the received requirement object complies with requirement element criteria for functional requirement objects. For example, a functional requirement element may be required to have a verify functionality that checks whether a design satisfies the requirement associated with the requirement element. As another example, a functional requirement may be required to have an error codes property that lists the error codes that invoking the verify functionality may return.

Quality requirements information 320 may include criteria for requirement objects, corresponding to quality requirements, used to assess characteristics of a system represented by a design. The quality requirements may include any requirement associated with the system, which are not functional requirements. For example, the quality requirements may include one or more of requirements related to dependability, availability, reliability, quality of service, maintainability, performance, etc. In one example, requirements framework 200 may receive a requirement object that corresponds to a quality requirement and that is used to determine that a camera of a system weighs less than a particular maximum amount (e.g., 75 grams). In another example, requirements framework 200 may receive a requirement object that corresponds to a quality requirement and that is used to determine that a frame delay jitter of a video stream of a camera is less than a particular value (e.g., 50 microseconds). Requirements framework 200 may use quality requirements information 320 to determine whether the received requirement object complies with requirement element criteria for quality requirement objects. As discussed below, requirements framework 200 may transform a functional requirement into a quality requirement and/or transform a quality requirement into a functional requirement (e.g., when the design is transformed).

Architectural requirements information 330 may include criteria for requirement objects, corresponding to architectural requirements, used to assess an architecture of a design. An architecture of a design may refer to, for example, elements included in the design, structure/organization of the elements, and/or interactions between the elements. For example, requirements framework 200 may receive a requirement object used to determine that a horizontal position control element of a design is dependent on (e.g., is part of) a controller element of the design. Requirements framework 200 may use architectural requirements information 330 to determine whether the received requirement object complies with requirement element criteria for architectural requirement objects.

Stylistic requirements information 340 may include criteria for requirement objects, corresponding to stylistic requirements, used to assess whether design standards (e.g., style guidelines) are met by a design and/or an implementation of a design. Design standards may include/refer to any preferences for presenting the design. Adherence to design standards by a design and or an implementation of a design, may not affect a result of an execution of the design. In one example, requirements framework 200 may receive a requirement object used to determine that a graphical model does not have crossing lines. In another example, requirements framework 200 may receive a requirement object used to determine that a software code of an implementation does not include an identifier, of a variable, that includes only a single character. Requirements framework 200 may use stylistic requirements information 340 to determine whether the received requirement object complies with requirement element criteria for stylistic requirement objects.

Example Requirement Structure

Figure 4:
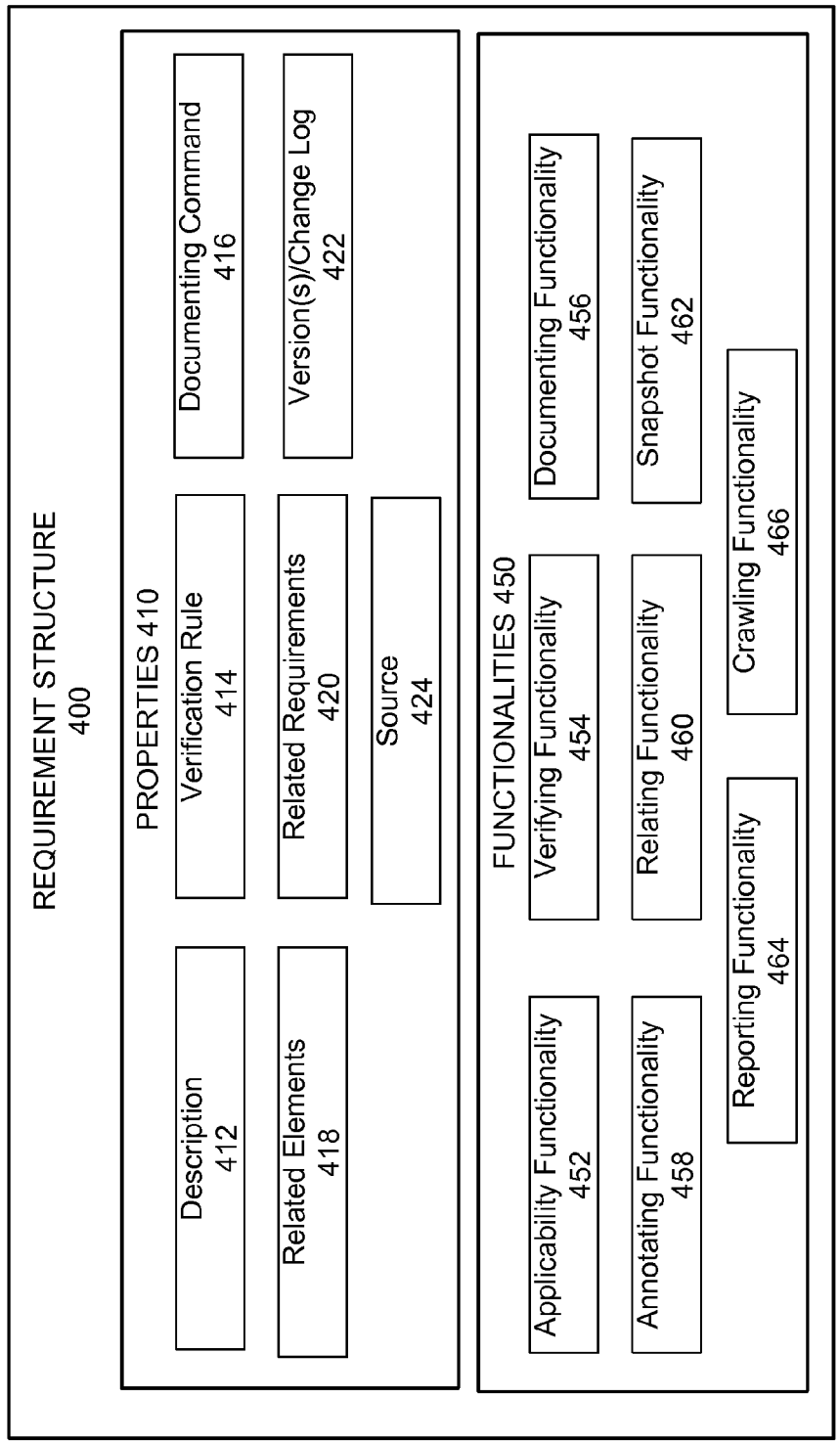
FIG. 4 is a diagram illustrating an example requirement structure.

FIG. 4 is a diagram illustrating an example requirement structure 400 for a particular requirement object. As shown in FIG. 4, requirement structure 400 may include properties 410 and functionalities 450. A user may use object-oriented techniques to create each one of properties 410 and functionalities 450 based on one or more objects. Herein, a functionality may refer to a method, a procedure, a subroutine, an instruction, etc. The user may also set requirement element criteria that specify which properties 410 and which functionalities 450 the particular requirement object is to, preferred to, and/or allowed to include.

As further shown in FIG. 4, properties 410 may include a description 412, a verification rule 414, a documenting command 416, related elements 418, related requirements 420, versions/change log 422, and a source 424. In practice, properties 410 may include additional properties, fewer properties, or different properties than shown in FIG. 4.

Description 412 may include a natural language description of a requirement corresponding to the requirement object. Description 412 may also include a description of when the requirement is applicable.

Verification rule 414 may specify a requirement (e.g., camera weight <75 grams). Additionally, or alternatively, verification rule 454 may store specifications, which define characteristics (e.g., of an element, a data set, connected elements, a configuration, etc.) necessary to satisfy the requirement.

Documenting command 416 may be used to create documentation for a requirement in a particular format defined, for example, by an entity, including a user. In one implementation, the documentation may include properties and functionalities of the requirement and/or of one or more related requirements. In another implementation, the documentation may identify only a subset of all properties and functionalities of the requirement. For example, the documentation may only identify properties and/or functionalities that are related to the verification of the requirement. Related elements 418 may specify one or more elements of a design (e.g., identification of particular block(s) of a graphical model), one or more elements of an implementation of the design, and/or one or more portions of data (e.g., created by implementing/executing the design/implementation) that are related to a requirement. Related requirements 420 may store identifiers of other requirements/requirement objects that are related to the requirement.

Versions/change log 422 may store information about versions of functionalities included in a requirement object and/or an explanation regarding which changes were made. For example, an explanation may state/indicate that a version of a functionality was changed/updated because a new functionality was added to the requirement object corresponding to the requirement.

Additionally, or alternatively, versions/change log 422 may store information relating to version(s) of the requirement object over time. Versions/change log 422 may store the information as snapshots of the requirement object. A snapshot of the requirement object may specify which functionalities and/or properties are included in the requirement object and at which point in time. Additionally, or alternatively, a snapshot may include results of evaluating requirement functionalities.

Source 424 may identify an external source of a requirement object that includes source 424 and/or of a requirement corresponding to the requirement object. For example, source 424 may identify a particular collection of requirements, a particular database, a vendor, a model line, and/or a particular library that included the requirement object and/or a class from which the requirement object is instantiated.

One of properties 410 of the requirement object may reference a property of a different requirement object. When the referenced property, of the different requirement object, is modified, the one of properties 410 may automatically adjust to mirror the modified referenced property. Conversely, when the one of properties 410 is modified, the referenced property may also automatically adjust to mirror the modified one of properties 410. In another implementation, one or more of properties 410 may reference one or more different properties of one or more different requirement objects.

As further shown in FIG. 4, functionalities 450 may include an applicability functionality 452, a verifying functionality 454, a documenting functionality 456, an annotating functionality 458, a relating functionality 460, a snapshot functionality 462, a reporting functionality 464, and a crawling functionality 466. In practice, functionalities 450 may include additional functionalities, fewer functionalities, or different functionalities than shown in FIG. 4.

Applicability functionality 452 may determine whether a requirement, corresponding to a requirement object that includes applicability functionality 452, is applicable to a design. Requirements framework 200 may utilize other functionalities of the requirement object, to test whether a particular design satisfies the requirement, when an output of applicability functionality 452 indicates that the requirement is applicable to the design. In one implementation, applicability functionality 452 may determine whether a requirement object is applicable to a design based on description 412, related elements 418, and/or other information of the requirement object and/or based on information associated with design elements of the design. As discussed above, the design information associated with the design elements may include a name, a type, an annotation, a tag, a link, etc.

In one example, description 412 may specify that a particular requirement is applicable to a camera component, when the camera component is used as part of a carriage component. Applicability functionality 452 may determine, based on description 412 and/or related elements 418, that a requirement is applicable to a design when the design includes particular design elements (e.g., a camera block) and/or particular design characteristics (e.g., the camera block depends on a carriage block). In another example, applicability functionality 452 may determine whether a particular requirement for continuous-time signals (e.g., that a data type of continuous time signals is double) is applicable to a design. Applicability functionality 452 may determine that the particular requirement is applicable when the design includes continuous-time signals. Requirements framework 200 may notify a user when applicability functionality 452 determines that a requirement is not applicable. Requirements framework 200 may, for example, notify the user by presenting a warning in a dialog box or by making a statement in a report.

Verifying functionality 454 may determine whether a design satisfies a requirement, for example, based on verification rule 414. Documenting functionality 456 may use documenting command 416 to create documentation for a requirement.

Annotating functionality 458 may annotate the design, for example, based on an output of applicability functionality 452, an output of verifying functionality 454, and/or related components 418. Annotating functionality 458 may annotate related components 418 to indicate whether the design/the related components have a requirement associated with them and/or whether they satisfy a requirement. For example, annotating functionality 458 may annotate a block, of a design, that represents a camera to indicate that the camera satisfies (or does not satisfy) a requirement (e.g., to indicate that the camera weighs less than 75 grams).

Relating functionality 460 may provide identifiers of other requirements/requirement objects that are related to the requirement corresponding to the particular requirement object. Relating functionality 460 may retrieve the identifiers of the other requirements/requirement objects from related requirements 420. Requirements framework 200 may determine whether a design satisfies the other requirements whenever requirements framework 200 invokes verifying functionality 454.

Snapshot functionality 462 may create and store snapshots of a requirement object. Snapshot functionality 462 may create and store a snapshot of the requirement object when snapshot functionality 462 is invoked, on a periodic basis (e.g., once every hour), and/or when certain events occur (e.g., a new functionality is added to the requirement object). Snapshot functionality 462 may store the snapshots in versions/change log 422, a revision control system, and/or a configuration management system.

Reporting functionality 464 may create a report based on properties 410, output(s) of applicability functionality 452, output(s) of verifying functionality 454, and/or output(s) of documenting functionality 456 (e.g., over a period of time). For example, reporting functionality 464 may parse an output (e.g., of verifying functionality 454), analyze the parsed output, and create a report that specifies whether a design satisfies a requirement based on the analyzed parsed output. Additionally, or alternatively, the report may be based on properties, output(s) of applicability functionalities, output(s) of verifying functionalities, and/or output(s) of documenting functionalities of one or more other requirement objects (e.g., requirement objects identified in related requirements 420).

Crawling functionality 466 may identify components that satisfy the requirement associated with the requirement object based on information stored in description 412, verification rule 414, and/or one or more other properties 410 of the requirement object. Crawling functionality 466 may search through one or more databases, one or more online directories, and/or one or more other sources of information about components to identify one or more candidates (i.e., potential components of the design) that satisfy the requirement. The one or more databases, the one or more online directories, and/or the one or more other sources of information may store hardware specifications of components, data sheets of the components, models associated with the components, designs associated with the components, and/or code associated with the components. The information, stored in description 412, verification rule 414, and/or one or more other properties 410 of the requirement object, may include characteristics that are required and characteristics that are preferred. Crawling functionality 466 may classify the candidates based on how many/which of the preferred characteristics are included in each one of the candidates.

Additionally, or alternatively, crawling functionality 466 may also identify all designs that a requirement object may test against. The requirement object may test against a design when applicability functionality 452 determines that the requirement object is applicable to the design. Testing against the design may include invoking verifying functionality 454. As an example, assume that verifying functionality 454 may determine whether an angular velocity of a system represented by a design is more than a particular threshold and provide an output. Crawling functionality 466 may identify designs that have angular velocity as a parameter.

One of functionalities 450 of the requirement object may reference a functionality of a different requirement object. When the referenced functionality, of the different requirement object, is modified, the one of functionalities 450 may automatically adjust, for example, to reflect and/or mirror the modified referenced functionality. Conversely, when the one of functionalities 450 is modified, the referenced functionality may also automatically adjust, for example, to reflect and/or mirror the modified one of functionalities 450. In another implementation, one or more of functionalities 450 may reference one or more different functionalities of one or more different requirement objects.

Example Object-Oriented Structure for Requirements

Figure 5:
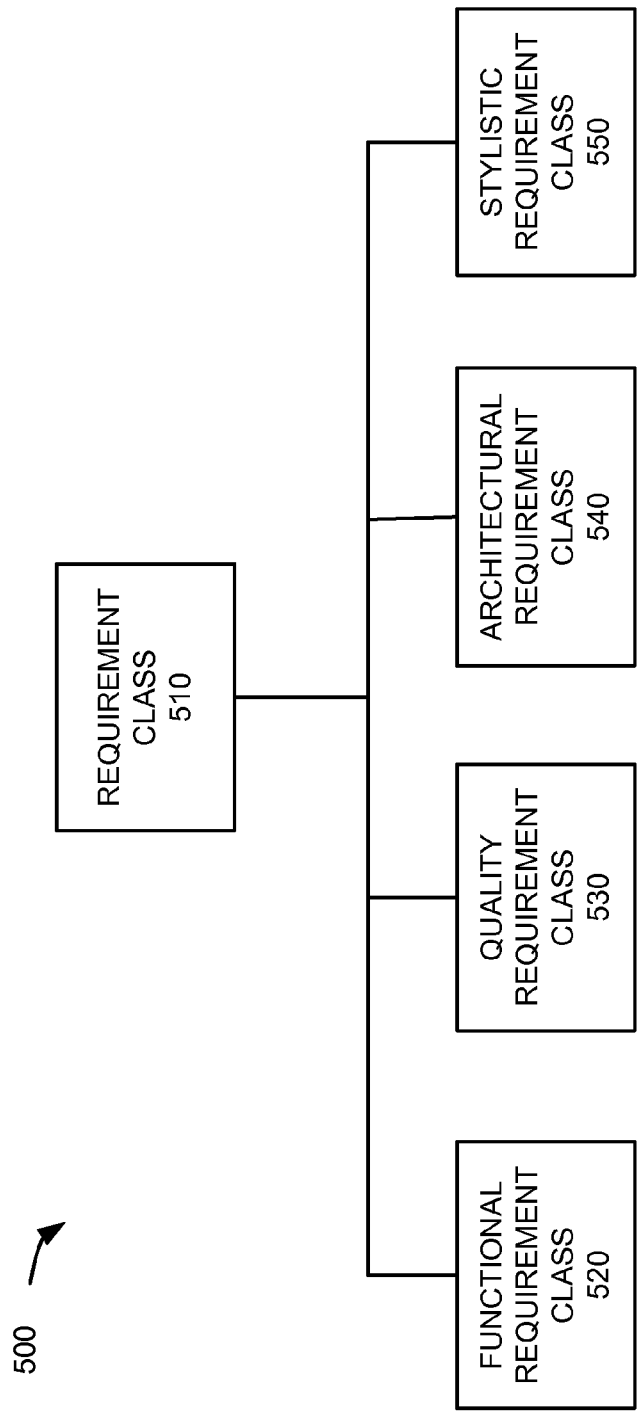
FIG. 5 is a diagram illustrating an example object-oriented architecture for requirements.

FIG. 5 is a diagram illustrating an example object-oriented architecture 500 for requirements. As shown in FIG. 5, object-oriented architecture 500 (called architecture 500 hereinafter) may include a common concrete or abstract class, labeled requirement class 510, for each of the requirements. Using requirement class 510, architecture 500 may use a single class to control characteristics of one or more functionalities and/or one or more properties of any requirement object that is instantiated for a particular, corresponding, requirement.

A user may use requirement class 510 to define one or more abstract classes. In an example implementation, as shown FIG. 5, the user may define a functional requirement class 520, a quality requirement class 530, an architectural requirement class 540, and a stylistic requirement class 550. Each one of functional requirement class 520, quality requirement class 530, architectural requirement class 540, and stylistic requirement class 550 may inherit functionalities, properties, and/or structure of requirement class 510.

Each one of functional requirement class 520, quality requirement class 530, architectural requirement class 540, and/or stylistic requirement class 550 may include additional functionalities and/or properties that are not defined in requirement class 510. For example, functional requirement class 520 may include a verifying functionality that is capable of determining whether a design satisfies a functional requirement.

Each one of functional requirement class 520, quality requirement class 530, architectural requirement class 540, and/or stylistic requirement class 550 may also include customized functionalities that overload functionalities of requirement class 510. For example, requirement class 510 may include a documenting functionality. Architectural requirement class 540 may include a customized documenting functionality that is designed to be invoked for a requirement object that is an instance of the architectural requirement class, instead of the documenting functionality of requirement class 510.

After additional (e.g., customized) functionalities and/or properties are added, each one of functional requirement class 520, quality requirement class 530, architectural requirement class 540, and/or stylistic requirement class 550 may provide a structure that satisfies criteria included in functional requirements information 310, quality requirements information 320, architectural requirements information 330, or stylistic requirements information 340, respectively.

The user may use one of functional requirement class 520, quality requirement class 530, architectural requirement class 540, or stylistic requirement class 550 to define an individual requirement subclass for a particular requirement based on a type of the particular requirement. The individual requirement subclass may inherit functionalities, properties, and/or structure of the parent class (i.e., one of functional requirement class 520, quality requirement class 530, architectural requirement class 540, or stylistic requirement class 550) that is used to create the individual requirement subclass. For example, a user may use functional requirement class 520 to create an individual requirement class corresponding to a functional requirement (e.g., a horizontal motor of a carriage must provide 15 Newton (N) units of force). The individual requirement class may inherit functionalities and/or properties that are defined in requirement class 510 and in functional requirement class 520.

The individual requirement class may also include additional functionalities and/or properties and/or functionalities that overload functionalities of the parent class. For example, the user may define a verification rule for determining whether the horizontal motor of the carriage provides 15 N. The user may add the verification rule as a new property of the individual requirement class. The user may also define a verifying functionality, for the individual requirements class, that uses the verification rule to determine whether the horizontal motor of the carriage provides 15 N and provides an output based on the determination. The verifying functionality may overload an existing verifying functionality of functional requirement class 520. The user and/or requirements framework 200 may instantiate a requirement object based on the individual requirement class. The user and/or requirements framework 200 may invoke a verifying functionality of the instantiated requirement object. The verifying functionality may be defined only for/in the individual requirements class.

Example Relationships Between Requirements and Components of a Design

Figure 6A:
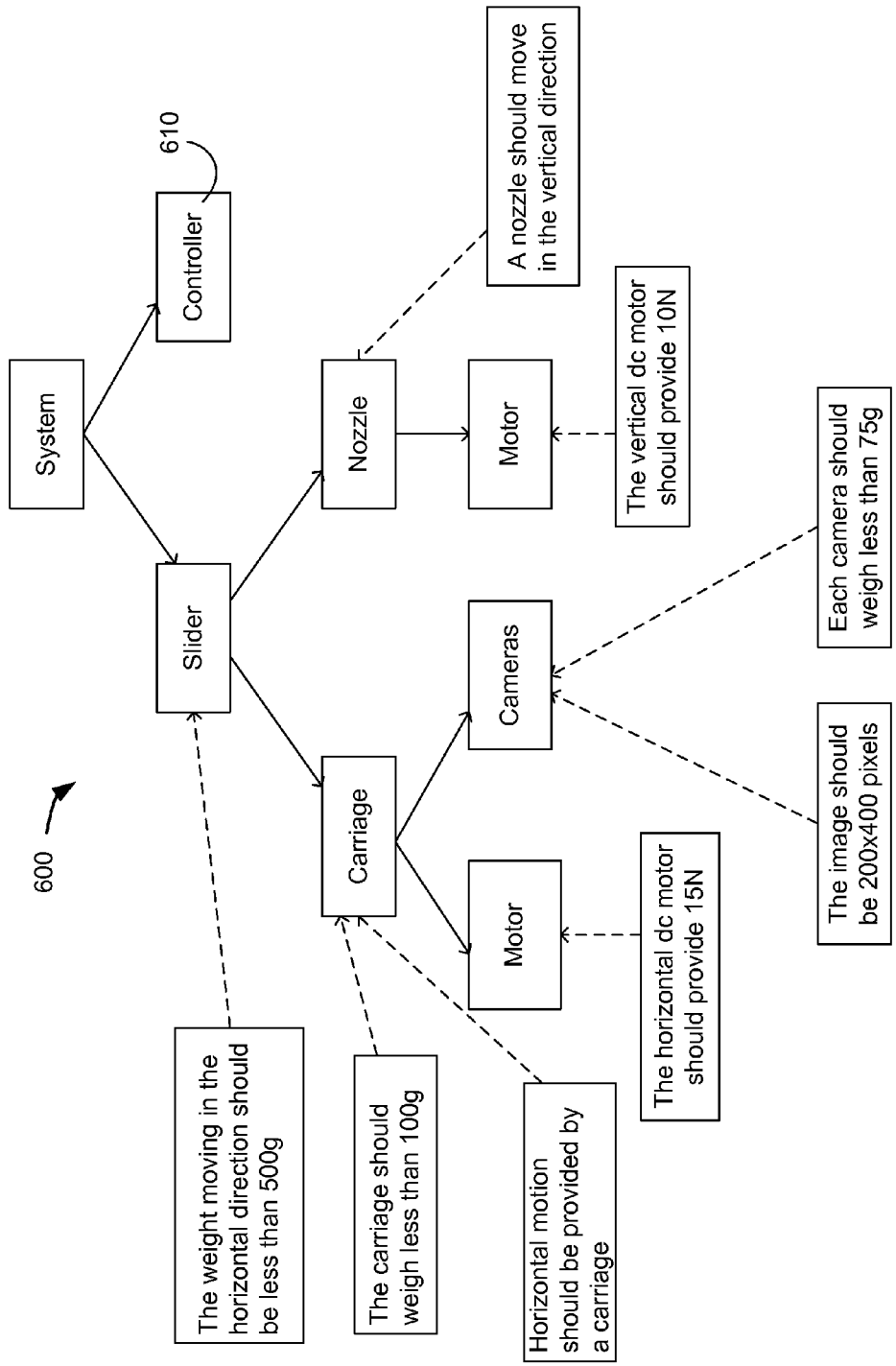
FIGS. 6A-6C illustrate example relationships between requirements and components of a design.
Figure 6B:
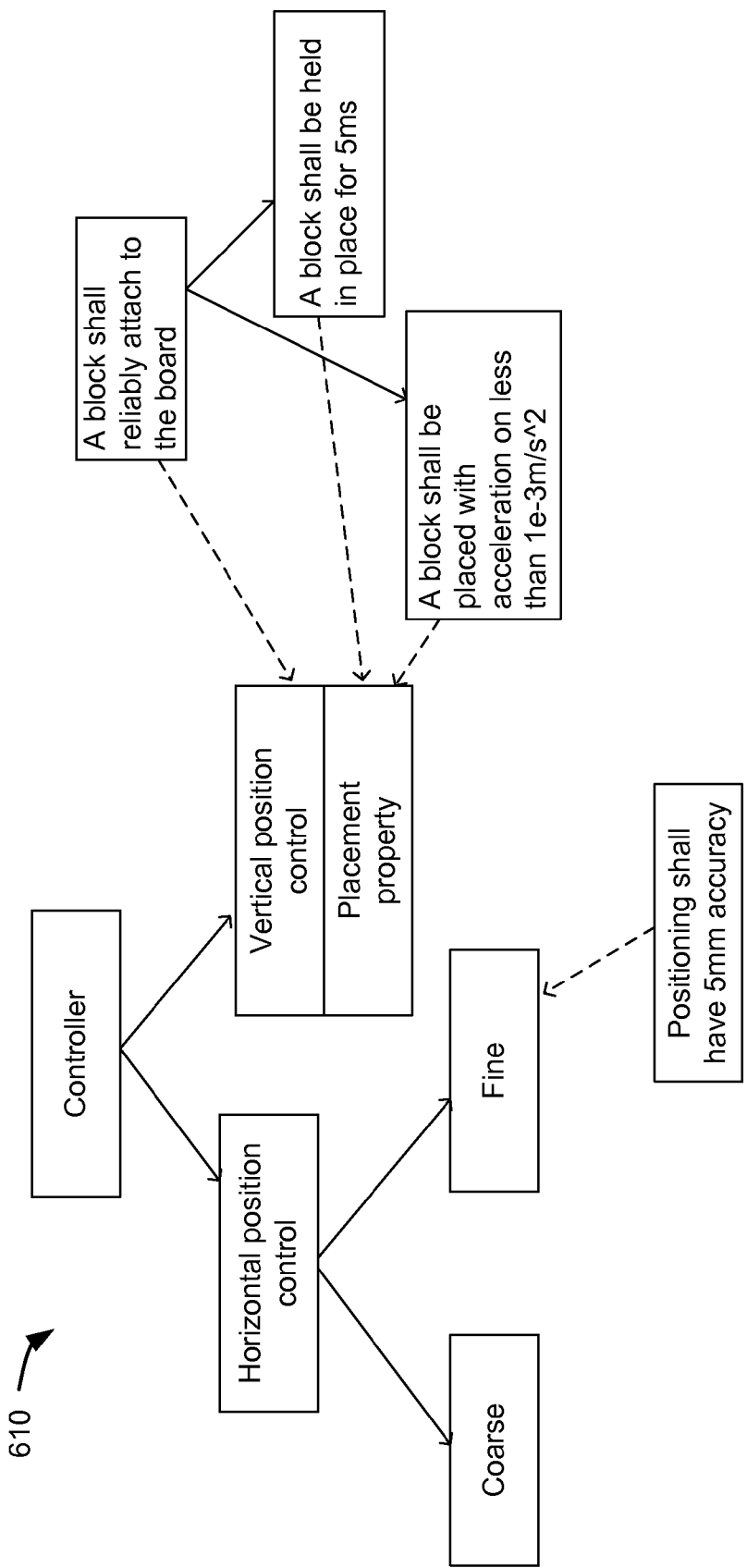
Figure 6C:
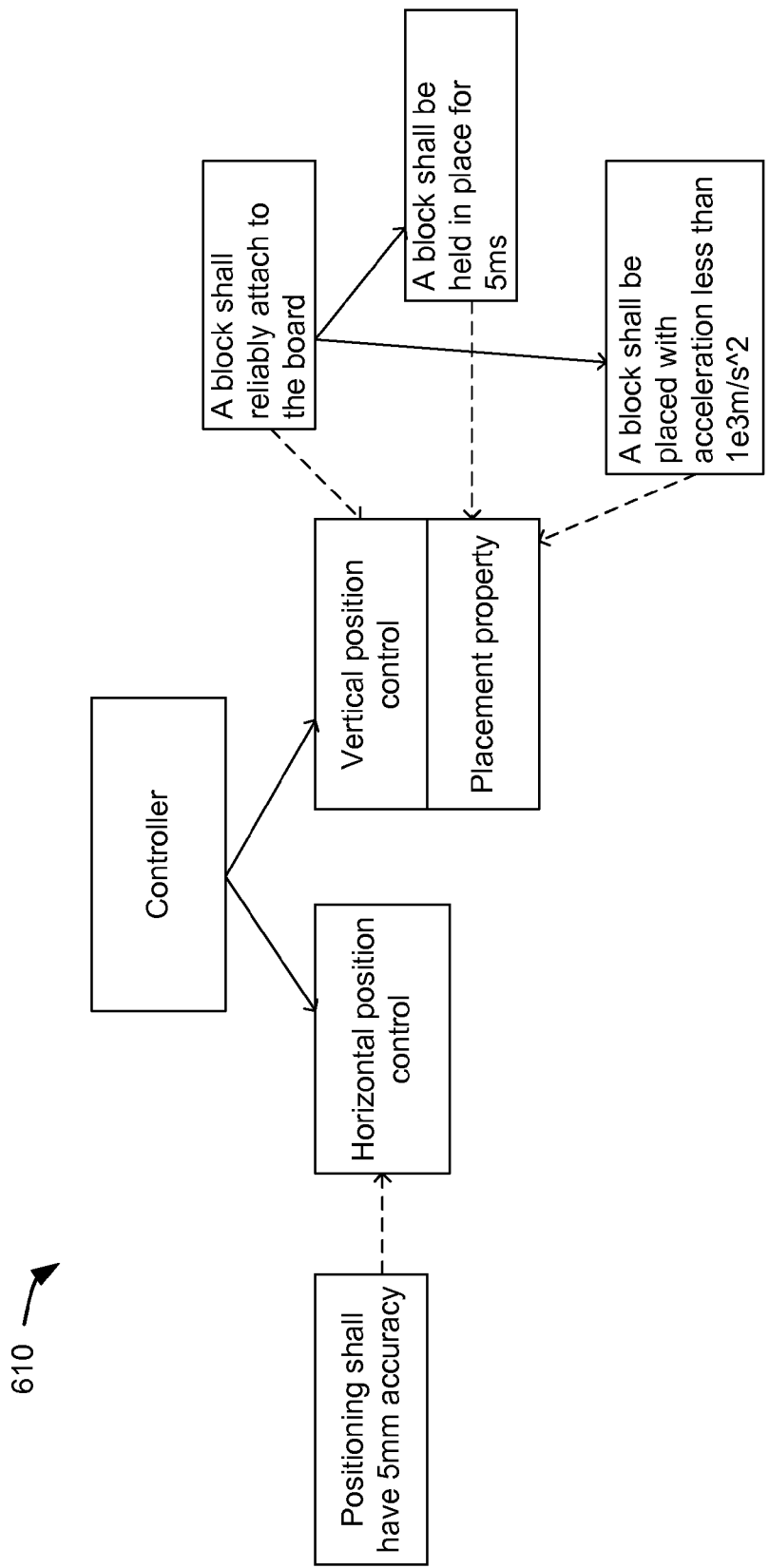

FIGS. 6A-6C illustrate example relationships between requirements and elements of a design. As shown in FIG. 6A, a design 600 may represent a system. A design may include one or more elements. The design may represent relationships between the elements. For example, a first element of the design may depend on a second element of the design. The relationship between the first element and the second element may indicate, for example, one or more of that the second element includes the first element, that the second element is connected to the first element, that the second element is attached to the first element, that the second element reads data that is written by the first element, etc.

As further shown in FIG. 6A, the system may include the following elements: a slider, a controller 610, a carriage, a nozzle, a first motor of the carriage, cameras, a second motor of the nozzle, and one or more elements of the controller (shown in FIG. 6B or FIG. 6C). The slider and the controller may depend on the system. Accordingly, the system may include the slider and the controller. The carriage and the nozzle may depend on the slider. Accordingly, the slider may include the carriage and the nozzle. The first motor and the cameras may depend on the carriage. Accordingly, the carriage may include the first motor and the cameras. The second motor may depend on the nozzle. Accordingly, the nozzle may include the second motor or the motor may be attached to the nozzle to move the nozzle.

As also shown in FIG. 6A, requirements may be associated with individual elements of design 600. For example, the slider element may move in a horizontal direction. A first requirement may indicate that for the slider to move fast enough in horizontal direction, the slider should weigh less than 500 grams. The first requirement may be associated with the slider.

A second requirement may indicate that the carriage should weigh less than 100 grams. The second requirement may be associated with the carriage. A third requirement may indicate that the carriage should provide horizontal motion (to the slider). The third requirement may also be associated with the carriage. A fourth requirement may indicate that the first motor should provide 15 N. The fourth requirement may be associated with the first motor, of the carriage.

A fifth requirement may indicate that the cameras should capture images with 200×400 pixels. The fifth requirement may be associated with the cameras. A sixth requirement may indicate that each of the cameras should weigh less than 75 grams. The sixth requirement may also be associated with the cameras. A seventh requirement may indicate that the nozzle should move in a vertical direction. The seventh requirement may be associated with the nozzle. An eighth requirement may indicate that the second motor should provide 10 N. The eighth requirement may be associated with the second motor, of the nozzle.

A user may create a different individual requirement object for each one of the aforementioned requirements. An individual requirement object may determine whether related element(s) of the system comply with a requirement corresponding to the individual requirement object. As discussed above, one or more individual requirement objects may be grouped into a collection of requirement objects.

As shown in FIG. 6B, controller 610 may include the following elements: a horizontal position control, a vertical position control, a coarse control of the horizontal position control, and a fine control of the horizontal position control. The coarse control and the fine control may depend on the horizontal position control. Accordingly, the horizontal position control may include the coarse control and the fine control. A ninth requirement may indicate that the fine control should have a 5 mm accuracy. The ninth requirement may be associated with the fine control. The coarse control may not be associated with any requirements.

As described above, design framework component 220 (FIG. 2) may eliminate the coarse control (see FIG. 6C) from design 600 because there are no requirements related to the coarse control. As a result, no specific coarse control may be used in the horizontal position control of the system. Furthermore, since only the fine control is dependent on the horizontal position control, the ninth requirement is equally applicable to a functioning of the horizontal position control, design framework component 220 may shift the ninth requirement up one higher hierarchical level (see FIG. 6C) of design 600 to be associated with the horizontal position control. Thereafter, design framework component 220 may also eliminate the fine control (see FIG. 6C) from design 600 because there are no requirements that are specifically related to a functioning of the fine control component.

In another example, the coarse control may be associated with one or more requirements (e.g., a requirement that the coarse control component should achieve positioning with a 100 mm accuracy in less than 500 ms). The coarse control may be eliminated, for example, in order to simplify the architecture of the system. Requirements framework 200 may then associate the requirements, which were associated with the coarse control, to a parent element of the coarse control (i.e., the horizontal position control). Requirements framework 200 may modify the properties and/or functionalities of requirement objects corresponding to the requirements in order to associate the requirements with the horizontal position control. For example, requirements framework 200 may modify related components 418 property, of the requirement objects, to identify a "horizontal_position_control" design element instead of a "coarse_control" design element.

As further shown in FIGS. 6B and 6C, vertical position control may include/be associated with a placement property. The vertical position control may satisfy one or more requirements that may be based on the placement property. Furthermore, a requirement may depend on one or more other requirements. In this instance, a design may satisfy the requirement only when the design also satisfies the one or more other requirements.

For example, a tenth requirement may indicate that the vertical position control should reliably attach a block to a board. The tenth requirement may only be satisfied when the design satisfies an eleventh requirement and a twelfth requirement. The tenth requirement may be associated with the vertical position control. The design may satisfy the eleventh requirement when the placement property, associated with the vertical position control, indicates that the block is placed with less than a particular acceleration. The design may satisfy the twelfth requirement when the placement property, associated with the vertical position control, indicates that the block is held in place for at least a particular period of time.

Example of Transforming a Design and Requirements

FIG. 7A illustrates an example of transforming a design and requirements associated with the design. A requirements framework may store rules for modifying an existing requirement and/or deriving a new requirement. When modifying existing requirements, the rules may specify, for example, adding a requirement to the requirements, subtracting a requirement from the requirements, and/or transforming the requirements. When deriving new requirements, the rules may specify, for example, deriving new requirements that are applicable to a design based on a state of the design. In one implementation, each of the requirements may be associated with a different requirement object. In another implementation, multiple requirements may be associated with a single element of a design. Multiple requirement objects, corresponding to the multiple requirements, may be stored as a collection of requirement objects (e.g., in an array).

Requirements framework 200 may check the multiple requirement for consistency. For example, requirements framework 200 may determine that multiple requirements are not consistent when a first requirement requires a weight of a design element to be less than 50 grams and a second requirement requires the weight of the design element to be more than 60 grams. Requirements framework may transform, as described below, the inconsistent requirements into one or more consistent requirements (e.g., or derive one or more consistent requirements from the inconsistent requirements). For example, requirements framework 200 may transform the first requirement and the second requirement into a single requirement that requires the design element to weigh between 50 grams and 60 grams.

In the example of FIG. 7A, the requirements framework may receive a first design stage 702. First design stage 702 may represent a system (e.g., a robot). First design stage 702 may include a graphical model, which includes one or more elements (e.g., a representation of a graphical model with three elements is illustrated in FIG. 7A). Each element of the graphical model may include one or more sub-elements. Each one of the elements and the sub-elements, of the graphical model, may correspond to one or more elements of the system.

The requirements framework may also receive a functional requirement 710, a quality requirement 720, and a functional requirement 730. Each of functional requirement 710, quality requirement 720, and functional requirement 730 may relate to the design and/or one or more elements of the design. The requirements framework may determine whether first design stage 702 satisfies functional requirement 710, quality requirement 720, and/or functional requirement 730.

A user may use the requirements framework to transform first design stage 702 into a second design stage 704. Second design stage 704 may also represent the system. Second design stage 704 may, for example, include more particulars of the system than first design stage 702. For example, second design stage 704 may include two elements of first design stage 702 and sub-elements of a third element of first design stage 702.

In the example of FIG. 7A, assume that the requirements framework determines that the requirement corresponding to functional requirement 710 is still applicable to second design stage 704 and/or that the requirements framework may use functional requirement 710 to determine whether second design stage 704 satisfies the requirement. Thus, the requirements framework may not modify functional requirement 710. The requirements framework may, however, transform, based on second design stage 704, quality requirement 720 and functional requirement 730 into a quality requirement 725 and a functional requirement 735, respectively. The requirements framework may also determine that an additional requirement, a functional requirement 740, is also applicable/relates to second design stage 704. The requirements framework may determine whether second design stage 704 satisfies functional requirement 710, quality requirement 725, functional requirement 735, and/or functional requirement 740.

In one implementation, transformation of requirements may include property value transformations. For example, quality requirement 720 may require a design element to weigh less than 50 grams. Second design stage 704 specifies that weight related requirements should be in kilograms. The requirements framework may transform quality requirement 720 into quality requirement 725 that requires the design element to weigh less than 0.05 kilograms. In another implementation, the transformation may include selecting a single (e.g., middle) point from a range specified by one or more requirements for a new (e.g., derived) requirement. In yet another implementation, the requirements framework may transform a quality requirement that requires the design element to either weigh 40 or 50 grams and a quality requirement that requires the design element to weigh not more than 45 grams into one requirement that requires the design element to weigh 40 grams. In still yet another implementation, the requirements framework may transform a requirement of one type into a requirement of another type (e.g., from a quality requirement into a functional requirement).

For example, one of the sub-elements, included in second design stage 704, may include cameras. Functional requirement 710 may relate to one or more components of second design stage 704 that do not correspond to the cameras. Quality requirement 725 and functional requirement 735 may take into account that the system includes one or more cameras, unlike quality requirement 720 and functional requirement 730. Functional requirement 740 may include an additional requirement related (e.g., uniquely) to the cameras.

Figure 7B:
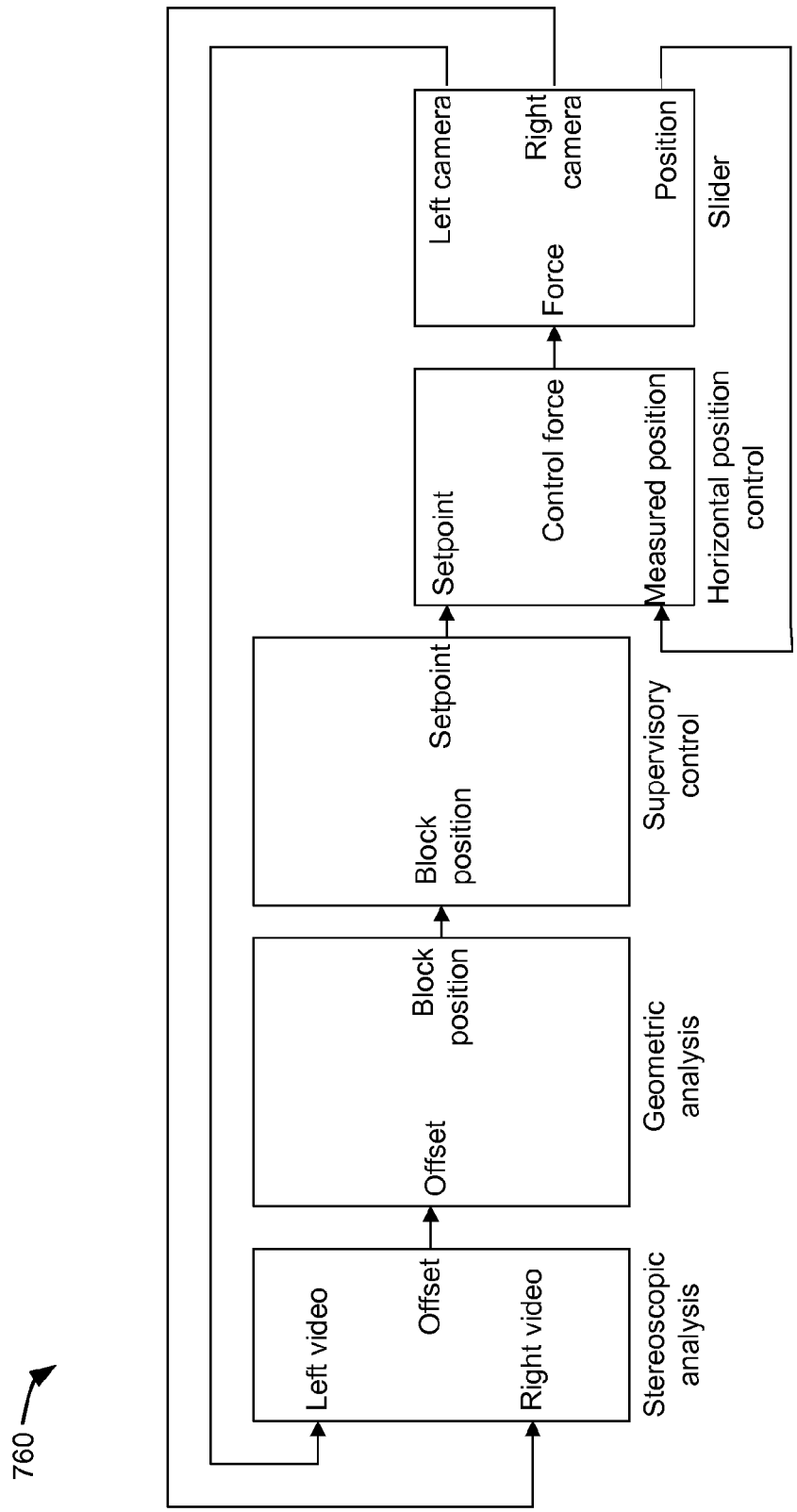
FIG. 7B illustrates an example of a transformed design.

FIG. 7B illustrates an example of a transformed design 760 that is a graphical model of a system. The system may locate a block that is to be attached to a board by using stereoscopic vision. As shown in FIG. 7B, transformed design 760 may include a slider subsystem, a stereoscopic analysis element, geometric analysis element, a supervisory control, and a horizontal position control. The slider subsystem may include a design of a slider with a left camera and a right camera. The left camera and the right camera may produce a video stream as the slider moves over a block located beneath the slider. The slider may output these video streams and a current position of the slider. The stereoscopic analysis element may input the video streams.

The stereoscopic analysis element may compare frames in the video streams to find an offset at which they best correlate. The stereoscopic analysis element may output the offset. The geometric analysis element may input the offset, and compute the position of the block based on the offset. The supervisory control may input the block position determined by the geometric analysis. The supervisory control may initially produce a setpoint at a maximum range of where the block may be located in order to perform a full sweep until a location of the block is found. After the location of the block is found, the supervisory control may produce a setpoint equal to the location of the block. The horizontal position control may input the setpoint from the supervisory control, and may input the measured position from the slider subsystem. The horizontal position control may compute a difference, between the setpoint and the measured position, to derive a control force that controls a motor of the slider that moves the slider over the block.

The horizontal position control has a setpoint that is dependent on the stereoscopic vision. Assume that the horizontal position control has a functional requirement that horizontal position control should have a 5 mm accuracy (as shown in FIG. 6B). The functional requirement is also applicable to its setpoint input. The setpoint input is based on an output of the geometric analysis element. Therefore, the functional requirement is also applicable to the output of the geometric analysis element. Furthermore, the output of the geometric analysis element is based on stereoscopic analysis of the video streams outputted by the slider subsystem. Accordingly, the combination of the left camera and the right camera should support the 5 mm accuracy functional requirement.

An entity may formulate the functional requirement in a spreadsheet (e.g., by using a commercial spreadsheet application). The spreadsheet may include a row that represents a requirement. The row may include one or more entries, including, for example, entries for a name, a requirement identifier, a description, an element (e.g., of a design, such as a graphical or textual model, or a data set) that the requirement relates to, one or more expressions (e.g., an equality, an inequality, or a logic predicate), and/or entries for one or more other properties related to the requirement (e.g., a nominal value or a distribution value, which may be used for Monte Carlo simulation). For example, Table 1, below, illustrates an example of a spreadsheet that includes a row that represents the 5 mm accuracy requirement of the horizontal position control.

TABLE 1

| name | identifier | description | element | expression |
| --- | --- | --- | --- | --- |
| horizontal positon control | hpos_control | 5 mm accuracy of horizontal position control | hpos_ctrl_delta | abs(hpos_ctrl_delta) < 0.005 |

A requirements framework may parse the entries to create a requirement object with properties and functionalities. For example, the requirements framework may create the requirement object with description 412 (as shown in FIG. 4) that includes a string "5 mm accuracy of horizontal position control." The verifying functionality 454, of the requirements framework, may include an expression in code "hpos_ctrl_delta<0.005" that may be used to determine whether the requirement is satisfied.

In another implementation, a requirements framework may analyze a requirement to identify input values. For example, the value of hpos_ctrl_delta is an input of the expression "hpos_ctrl_delta<0.005." The requirements framework may locate a corresponding element (e.g., a signal or a block that represents the horizontal position control) in, for example, a design, and provide access to the values of hpos_ctrl_delta associated with the corresponding element. The requirements framework may configure the design and/or an execution engine to store the values of hpos_in_ctrl_delta in, for example, a workspace, when the design is executed by the execution engine.

As further shown in FIG. 7A, a user may further use the requirements framework to transform second design stage 704 into a third design stage 706. Third design stage 706 may also represent the system. Third design stage 706 may, for example, include more particulars of the system than second design stage 704. For example, third design stage 706 may include three components of second design stage 704 and sub-components of a fourth component of second design stage 704.

In the example of FIG. 7A, further assume that the requirements framework determines that the requirement corresponding to functional requirement 710 is still applicable to third design stage 706 and/or that the requirements framework may use functional requirement 710 to determine whether third design stage 706 satisfies the requirement. Thus, the requirements framework may not modify functional requirement 710. The requirements framework may, however, derive, based on an analysis of third design stage 706, a derived requirement 752, a derived requirement 754, and a derived requirement 756 from quality requirement 725, functional requirement 735, and/or functional requirement 740. The requirements framework may determine whether third design stage 706 satisfies functional requirement 710, derived requirement 752, derived requirement 754, and derived requirement 756.

For example, a first sub-component, included in third design stage 706, may correspond to/identify a first particular camera and a second sub-component, included in third design stage 706, may correspond to/identify a second particular camera. Derived requirement 752, derived requirement 754, and derived requirement 756 may relate to characteristics of the first particular camera, the second particular camera, and/or a system that includes both the first particular camera and the second particular camera. For example, derived requirement 752 may indicate that the video produced by the first particular camera should be in color. Derived requirement 754 may indicate that any image produced by the second particular camera should include 200×400 pixels. Derived requirement 756 may indicate that the first particular camera should be located 15 cm from the second particular camera.

For example, to determine accuracy in feature differentiation of the stereoscopic vision, design 760 (shown in FIG. 7B) may be executed to simulate a particular detection scenario. This scenario may produce the position at which a certain feature is located. The position may be compared against the actual simulated location. A requirement for a resolution of a camera may state that the resolution should be no higher than 800×640. Simulation with different resolutions may determine that a resolution of 200×400 pixels satisfies the 5 mm accuracy requirement. The requirement for the resolution may then be transformed to state that the resolution should be 200×400 pixels. Another requirement may then be derived to state that a signal carrying a video output of the camera shall be frame-based and of certain dimensions (e.g., each frame shall consist of 200×400 unsigned integers for each of the three colors red, green, and blue). This other requirement may be associated with the design element associated with the video output signal.

Other requirements may specify a physical distance between the cameras and whether the camera output is monochrome or in color. Values for these other requirements are based on what they should equal in order to satisfy the 5 mm accuracy requirements. For example, the 5 mm accuracy may require for the cameras to be 15 cm apart and for their output to be in 256 colors. Additionally, or alternatively, the requirements framework may evaluate design freedom for design 760. For example, design 760 may indicate the monochrome or color output as potential variants. A constraint may require for the output to be either monochrome or color (e.g., in case of mutually exclusive variants). Design may then execute with either variant to determine whether the 5 mm accuracy is achieved. In case both variants achieve the 5 mm accuracy, the requirements framework may evaluate a quality requirement such as cost to determine which variant should be made explicit in a derived requirement. The variants may be represented by variant objects and/or the constraints by constraint objects.

In one implementation, the transformed and/or derived requirements may include reference to the requirement and/or requirements that they were transformed and/or derived from. Additionally, or alternatively, the requirement and/or requirements from which requirements were transformed and/or derived may include reference to the transformed and/or derived requirements.

In another implementation, model checking methods may be employed instead of, or in addition with, simulation methods, to, for example, check whether a design satisfies a requirement and/or to find value of design parameters that comply with a requirement. When using model checking, properties of a design element as specified by a requirement may be considered representative of the design element. For example, if the requirement associated with a block in a graphical model specifies that a block (e.g., a subsystem) output shall be either 0 or 1, then the model checker may check the design for both these cases without considering the details of the block (e.g., the internals of a subsystem).

Example Processes

Figure 8A:
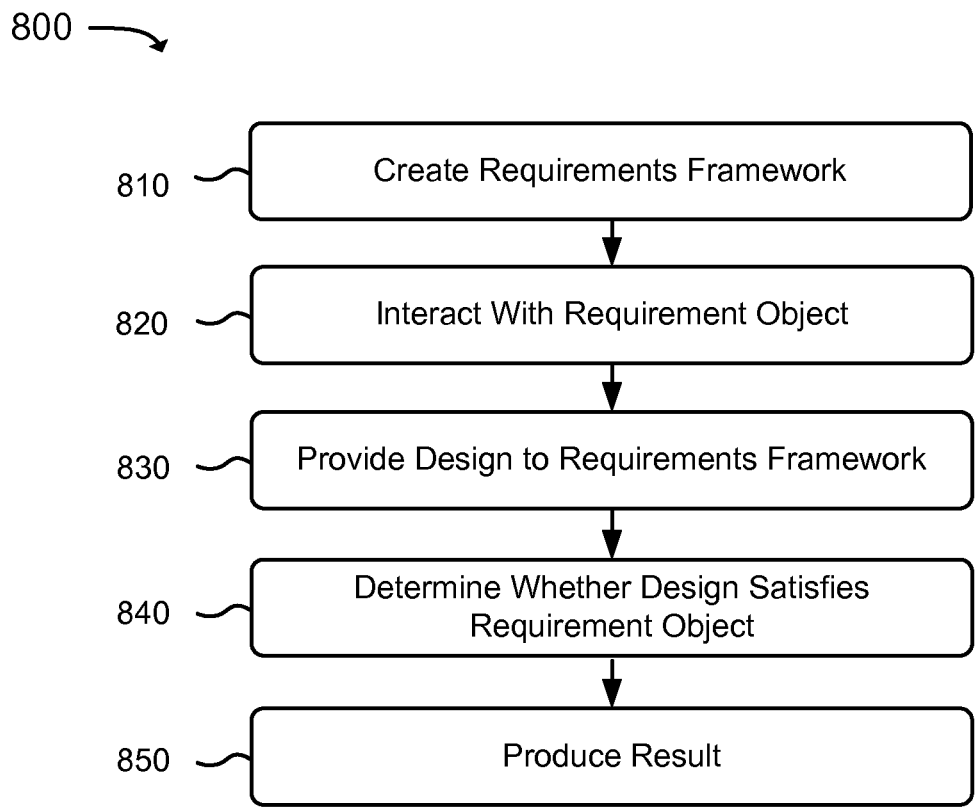
FIG. 8A is a flowchart of an example process for using a requirements framework.

FIG. 8A is a flowchart of an example process 800 for using a requirements framework. The requirements framework may include requirements framework 200, of FIG. 2, or a portion of requirements framework 200. Device 100 may perform process 800.

As shown in FIG. 8A, process 800 may include creating the requirements framework (block 810). For example, a user may use object-oriented programming techniques to create the requirements framework, which may be object based. The requirements framework may include one or more of the components described above with reference to requirements framework 200 of FIG. 2. A requirements framework component, of the requirements framework, may include requirements information. The requirements information may include, for example, requirement element criteria, applicability criteria, invocation criteria, and/or rules for transforming requirement objects and/or collections(s) of requirement objects. The requirements framework may use the requirements information to perform operations associated with requirement objects. Each of the requirement objects may correspond to a different requirement. An example process for creating the requirements framework is described below with reference to FIG. 8B.

Process 800 may further include interacting with a requirement object (block 820). For example, a user may provide a requirement object to the requirements framework. The requirement object may refer to a requirement object instantiated based on a requirement class that corresponds to, for example, a particular requirement. The requirements framework may determine a type of the particular requirement corresponding to the existing requirement object. The type of the particular requirement may be one of the defined requirements types, such as a functional requirement type, a quality requirement type, an architectural requirement type, or a stylistic requirement type. The requirements framework may interact with the requirement object based on the type of the particular requirement.

Interacting with the requirement object may include modifying the requirement object or creating a new requirement object. The modified requirement object or the new requirement object may comply with the requirement element criteria associated with the type of the particular requirement.

In another implementation, the requirements framework may interact with the requirement object based on instructions from the user. The instructions may specify one or more different objects and/or one or more of the defined operators. The one or more different objects may include one or more different requirement object(s), one or more sets of requirement objects, one or more functionalities, and/or one or more properties. The requirements framework may interact with the requirement object based on the type of the particular requirement, the one or more different objects, and/or the one or more of the defined operators.

In one example, the instructions may specify the addition operator and a different requirement object. Based on the addition operator, the requirements framework may add the different requirement object to the requirement object to produce the modified requirement object. A definition of the addition operator may specify rules for selecting first functionalities from the existing requirement object and for selecting second functionalities from the different requirement object. The modified existing requirement object may include the first functionalities and the second functionalities.

In another example, the instructions may specify the addition operator, a new functionality, and/or a new property. Based on the addition operator, the requirements framework may add the new functionality and/or the new property to the existing requirement object to produce the modified existing requirement object or to create the new requirement object.

In yet another example, the instructions may specify a subtraction operator and the one or more different objects. Based on the subtraction operator, the requirements framework may subtract the existing requirement object and/or one or more other requirement objects from a collection of requirement objects; subtract a different collection of requirement objects from the collection of requirement objects; subtract one or more requirement objects of the defined requirements type from the collection of requirement objects; and/or subtract one or more functionalities and/or properties from the existing requirement object. The existing requirement object and/or the one or more other requirement objects may correspond to requirements that are associated with one of the defined requirements types.

In still another example, the instructions may specify a transformation operator and information about a new stage of design. Based on the new stage of the design, the requirements framework may transform the requirement object into a new requirement object, which also corresponds to the particular requirement. For example, the new requirement object may include an additional functionality that is able to determine whether a design that is of the new stage of design satisfies the particular requirement.

Returning to FIG. 8, process 800 may also include providing a design to the requirements framework (block 830). For example, the user may use device 100 to provide a design to the requirements framework. The requirements framework may receive the design. In one implementation, the received design may comply with design criteria, specified in the design framework component, of the requirements framework. In another implementation, the requirements framework may modify the received design to comply with the design criteria.

Process 800 may also include determining whether the design satisfies the requirement object (block 840) and producing a result (block 850). For example, the design may satisfy the requirement object when the design satisfies the particular requirement corresponding to the requirement object. The requirements framework may determine a type of the design (e.g., an architectural design). The requirements framework may retrieve, from the requirements framework component, applicability criteria associated with the requirement object. The requirements framework may determine whether the requirement object is applicable to the design based on the applicability criteria and the type of design. The requirements framework may determine whether the design satisfies the requirement object only when the requirement object is applicable to the design.

In another implementation, when determining whether the design satisfies the requirement object, the requirements framework may use an adaptor to provide additional functionality, in addition to functionality of the requirement object. In one example, a requirement object may include, for verifying functionality 454 (FIG. 4), a method call that does not return an error code. The requirements framework may use an adaptor that may transform the method call into a new method call that does return an error code (e.g., a 'no error' error code or a 'no error code returned' error code). In another example, a requirement object may support a simulation functionality and an assertion functionality. The requirements framework may use an adaptor to transform verifying functionality 454 into a sequence of functionalities that first invokes a simulation functionality and then evaluates an assertion functionality. In yet another example, the requirements framework may use an adaptor to adapt verifying functionality 454 to operate on a stream of input data (e.g., telemetry data). The adaptor may periodically store elements of the stream of data and may invoke verifying functionality 454 on a batch of data to determine whether the design satisfies a requirements associated with a requirement object.

After determining that the requirement object is applicable to the design, the requirements framework may invoke a verifying functionality of the requirement object and/or of the adaptor. The verifying functionality may determine whether the design satisfies the requirement object. The requirements framework may invoke a reporting functionality of the requirement object and/or of the adaptor. The reporting functionality may produce a result based on an output of the verifying functionality. The result may indicate whether the design satisfies the requirements associated with the requirement object.

Figure 8B:
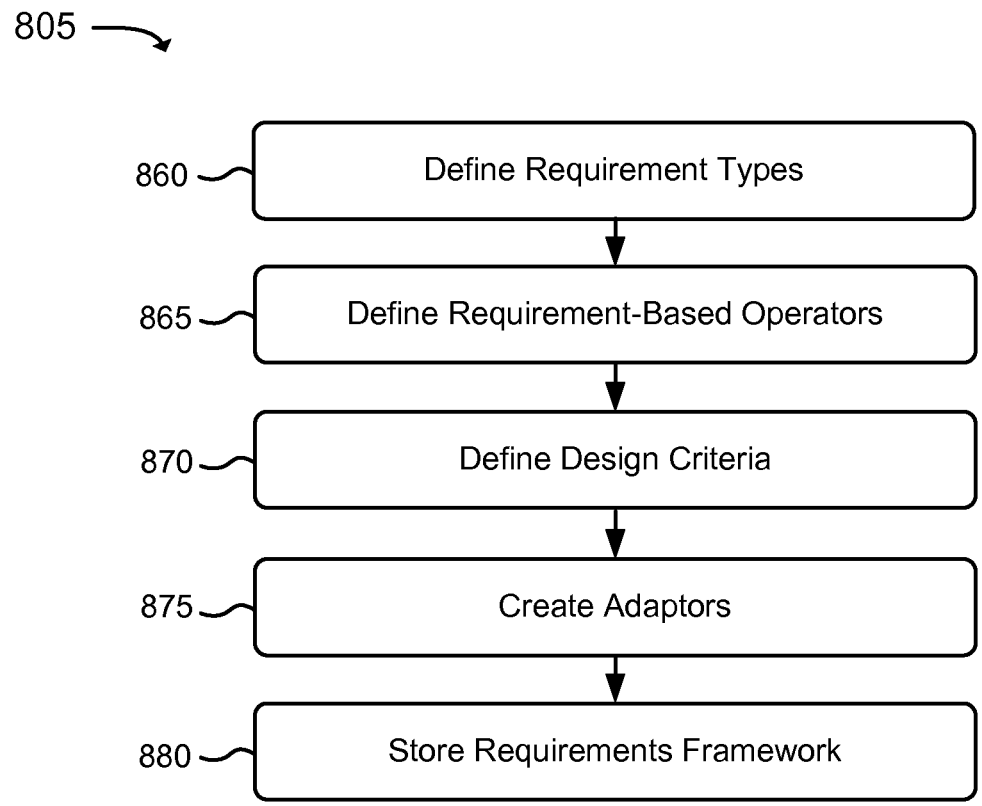
FIG. 8B is a flowchart of an example process for creating the requirements framework.

FIG. 8B is a flowchart of an example process 805 for creating the requirements framework. Process 805 may correspond to block 810 of FIG. 8A. Device 100 may perform process 805.

As shown in FIG. 8B, process 805 may include defining requirement types (block 860). For example, a user may define different requirement types in a requirements framework component of requirements framework 200. The requirement types may include a functional requirement type, a quality requirement type, an architectural requirement type, a stylistic requirement type, and/or one or more other types of requirements. Defining a requirement type may include defining requirement element criteria, applicability criteria, invocation criteria, and/or rules that are associated with the defined requirements type. Examples of requirement element criteria, applicability criteria, invocation criteria, and rules are described above with reference to requirements framework component 210 of FIG. 2.

Process 805 may further include defining requirement-based operators (block 865). For example, the user may define different requirement-based operators in the requirements framework component. The operators may include, for example, an addition operator to add a functionality, a property, or a requirement object to an existing requirement object; a subtraction operator to remove a functionality or a property from the existing requirement object; a concatenating operator to add one or more requirement objects to a collection of requirement objects; a subtracting operator to subtract one or more requirement objects from the collection of requirement objects; and/or one or more other operator that the user may use to prompt the requirements framework to perform an operation associated with a requirement object. Examples of using the operators are provided below with reference to FIGS. 10-12.

Process 805 may also include defining design criteria (block 870). For example, the user may define design criteria. The design criteria may specify characteristics of a design. The user may specify different characteristics for different types of designs, as described above with reference to design framework component 220 of FIG. 2. For example, the requirements framework and/or the user may specify one or more of that a particular type of design (e.g., an architectural design) should be parsable by a C or C++ parser, that the particular type of design should be a time-based block diagram, that an input of the model should come from root level input ports that have unique names, that the particular type of design should be in an array-based language, etc.

Process 805 may also include creating adaptors (block 875). For example, the user may create one or more adaptors. An adaptor may include one or more functionalities. The requirements framework may use the adaptor instead of modifying a requirement object to add functionalities, of the adaptor, to the requirement object.

Process 805 may also include storing the requirements framework (block 880). For example, device 100 may store the defined types, the defined operators, the design criteria, and/or the adaptors in the requirements framework. Device 100 may store the requirements framework in storage 140 (as shown in FIG. 1), in a different component of device 100, and/or in a different device.

Figure 9:
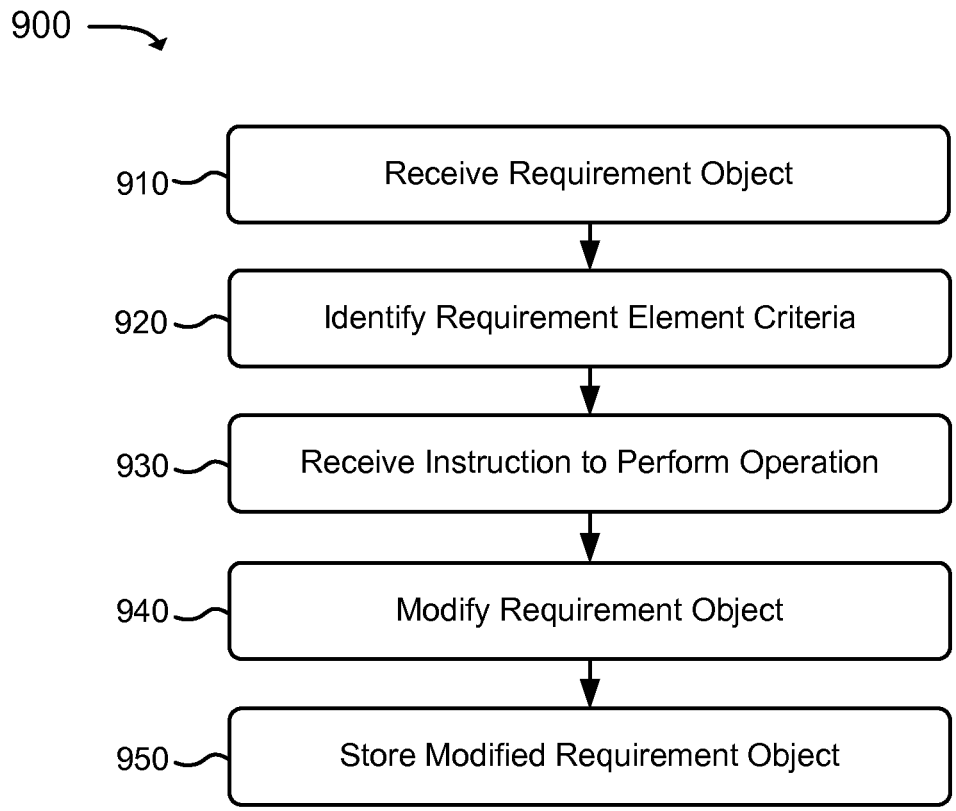
FIG. 9 is a flowchart of an example process of interacting with a requirements framework.

FIG. 9 is a flowchart of an example process 900 of interacting with a requirements framework. The requirements framework may include requirements framework 200, of FIG. 2, or a portion of requirements framework 200. Device 100 may perform process 900.

As shown in FIG. 9, process 900 may include receiving a requirement object (block 910). For example, a user may use object-oriented programming techniques to create an individual requirement class for a particular requirement. The individual requirement class may inherit functionalities and/or properties from one or more parent requirement objects/classes and/or one or more subclasses of the parent requirement objects/classes. The user may create/instantiate a requirement object based on the individual requirement class. The requirement object may include an object.

The user may group the requirement object with other requirement objects into a collection of requirement objects. The user may provide the requirement object, individually or as part of the collection of requirements to the requirements framework. The requirements framework may receive the requirement object.

Process 900 may also include identifying requirement element criteria (block 920). For example, the requirements framework may determine type(s) of the requirement object. For example, requirements framework may determine that the requirement object is of a functional requirement type. The requirements framework may identify requirement element criteria for the requirement object based on the type(s).

The requirement element criteria may specify one or more functionalities and/or one or more properties for the requirement object, associated with the type(s). For example, the requirement element criteria may specify that a quality requirement object should include a cost functionality that determines a cost measure based on power consumption, memory usage, etc.

Process 900 may also include receiving instructions to perform an operation (block 930). For example, the user may provide instructions for the requirements framework to perform an operation with the requirement object. In one implementation, the operation may include transforming the requirement object, transforming one or more other requirement objects by using the requirement object, and/or transforming one or more sets of requirement objects. In another implementation, the operation may include determining whether one or more designs comply with a requirement corresponding to the requirement object.

Process 900 may also include modifying a requirement object (block 940). For example, after identifying the requirement element criteria (block 920) and/or after receiving the instructions to perform the operation (block 930), the requirements framework may modify the requirement object. Modifying the requirement object may produce a modified requirement object. Producing the requirement object may include creating a new requirement object by instantiating a new requirement object based on the individual requirement class associated with (e.g., used to instantiate) the requirement object. The modified requirement object may comply with the identified requirement element criteria because, for example, the modified requirement object may include the functionalities and/or the properties specified by the identified requirement element criteria.

For example, the requirements framework may receive instructions to add one or more requirement objects to the received requirement object. The requirements framework may add the one or more requirement objects to the received requirement object based on the rules in the requirements framework component and the identified requirement element criteria. Adding the one or more requirement objects to the received requirement object may produce the modified requirement object. The modified requirement object may represent the received requirement object or the new requirement object. The modified requirement object may include a first set of functionalities from the one or more requirement objects and a second set of functionalities from the received requirement object. One or more types of the functionalities in the first set may or may not equal types of the functionalities in the second set.

In another example, the requirements framework may receive instructions to add a new functionality or a new property to the received requirement object. The requirements framework may add the new functionality or the new property to the received requirement object based on the rules in the requirements framework component and/or based on the identified requirement element criteria. Adding the new functionality or the new property to the received requirement object may produce the modified requirement object. As discussed above, the modified requirement object may represent the received requirement object or a new requirement object. In another implementation, the new functionality, in the modified requirement object, may be used as an alternative to a previously existing functionality of the received requirement object. The requirements framework may use the new functionality for a particular type of design. In yet another implementation, the requirements framework may replace an existing functionality of the received requirement object with the new functionality to produce the modified requirement object based on the instructions, the rules, and/or the identified requirement element criteria.

In yet another example, the requirements framework may receive instructions to subtract a particular functionality or a particular property from the received requirement object. The particular functionality or the particular property may match an existing functionality or an existing property, respectively, of the received requirement object. The requirements framework may subtract the particular functionality or the particular property from the received requirement object based on the rules in the requirements framework component and/or the identified requirement element criteria. Subtracting the particular functionality or the particular property from the received requirement object may produce the modified requirement object. As discussed above, the modified requirement object may represent the received requirement object or a new requirement object. Further examples of modifying requirement objects are described below in reference to FIG. 10-12.

Returning to FIG. 9, process 900 may also include storing the modified requirement object (block 950). For example, the requirements framework may store the modified requirement object in a memory, such as memory 130, or in storage, such as storage 140.

Once the modified requirement object is stored, the modified requirement object may be used in connection with a design, as described above with reference to blocks 830-850 of FIG. 8A. For example, the requirements framework may receive a design. The requirements framework may identify (e.g., based on a type of the design) applicability criteria associated with the modified requirement object. The requirements framework may retrieve the modified requirement object when the requirements framework identifies/determines that the modified requirement object complies with the applicability criteria. The requirements framework may use the retrieved modified requirement object to determine whether a design satisfies a requirement corresponding to the modified requirement object.

Using the retrieved modified requirement object may include identifying a functionality of the retrieved modified requirement object based on at least one of a type of the retrieved modified requirement object or a type of the design. The requirements framework may invoke the functionality in order to determine whether the design satisfies the requirement. During the invoking of the functionality, the requirements framework may interact with a functionality, a variable, or a value associated with the design.

Examples of Modifying Collections of Requirements

Figure 10:
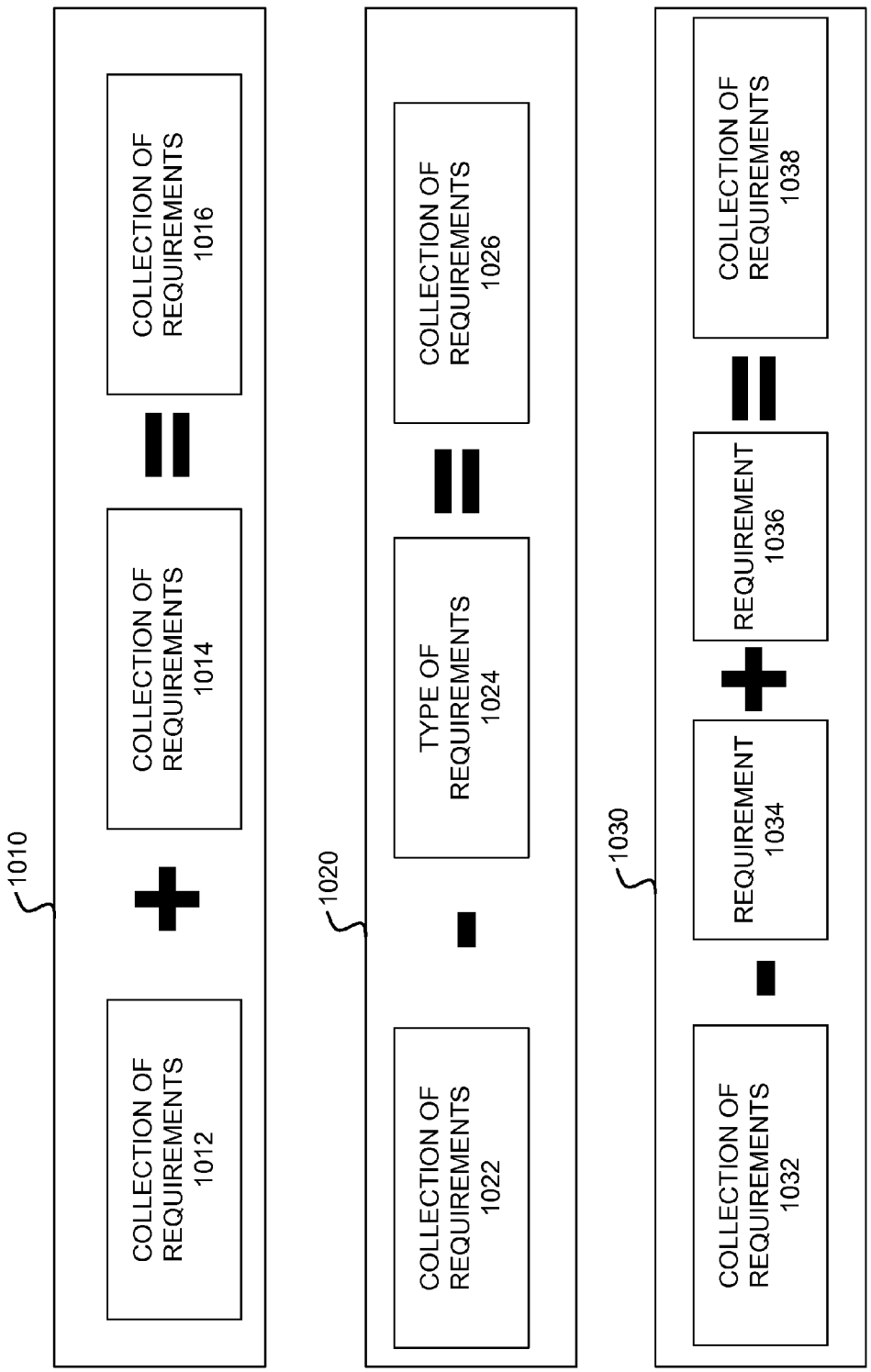
FIG. 10 illustrates examples of modifying collections of requirements.

FIG. 10 illustrates examples of modifying collections of requirements. A collection of requirements may include one or more requirements that are represented by different requirement objects. A user and/or a framework may organize the one or more requirements into the collection of requirements based on a use of the requirements, a type of the requirements, version(s) of the requirements, properties of the requirements, property values of one or more of the properties, functionalities of the requirements, implementations of one or more of the functionalities, and/or on one or more other factors. The other factors may include, for example, personal preferences of the user. The use of the requirements may include a type of designs (e.g., architecture designs) to which the requirements in the set are applicable, a subsystem of a design, and/or a type of systems (e.g., manufacturing machinery) represented by the designs.

FIG. 10 illustrates three examples 1010, 1020, and 1030 for modifying collections of requirements. The modifications may include the addition of one collection of requirements to another, the subtraction of one collection of requirements from another, or a combination of one or more addition and subtraction operations. For example, example 1010 illustrates an addition operation. In example 1010, a user and/or a framework has added a collection of requirements 1014 to a collection of requirements 1012 to create a collection of requirements 1016.

Example 1020 illustrates a subtraction operation. In example 1020, the user and/or the framework has subtracted a particular type of requirements 1024 from a collection of requirements 1022 to create a collection of requirements 1026. For example, type of requirements 1024 may represent quality type of requirements. The framework may identify requirements, of collection of requirements 1022, which are of the quality type. The framework may remove the identified requirement objects from collection of requirements 1022 in order to create collection of requirements 1026. Collection of requirements 1026 may not include any requirements that are of the quality type.

Example 1030 illustrates a subtraction operation and an addition operation. In example 1030, the user and/or the framework has subtracted requirement 1034, from a collection of requirements 1032, and has added a requirement 1036, to collection of requirements 1032, to create a collection of requirements 1038.

Examples of Performing Operations with Requirements

Figure 11:
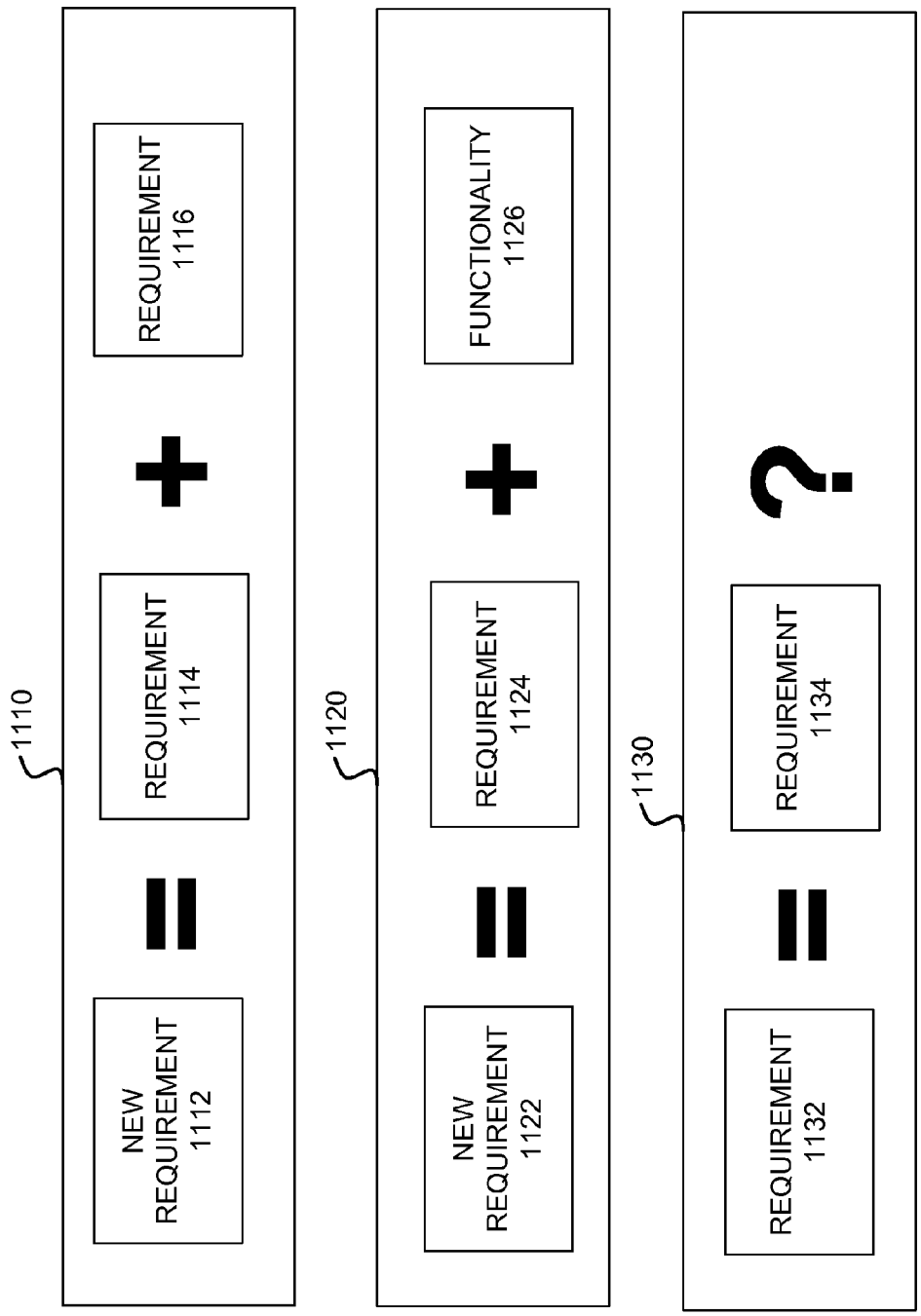
FIG. 11 illustrates examples of performing operations with requirements.

FIG. 11 illustrates examples 1110, 1120, and 1130 for performing operations with requirements. The operations may include the addition of one requirement with another, the addition of one requirement with a functionality, and determining whether one requirement matches another. Requirements framework 200 may use a new requirement created by one of the operations to determine whether a design satisfies a requirement associated with the new requirement.

For example, example 1110 illustrates an addition operation. As shown, the addition operation may include adding a requirement 1114 and a requirement 1116 to create a new requirement 1112. For example, requirements framework 200 may provide an interface. A user may, in the interface, specify a "+" operator between requirement 1114 and requirement 1116 to create requirement 1112.

Requirements framework 200 may store rules regarding how to interpret the "+" operator when combining requirements. For example, requirement 1114 may include a first document functionality and requirement 1116 may include a second document functionality. In one implementation, when performing the addition operation, based on the rules, requirements framework 200 may include, in new requirement 1112, the first document functionality and the second document functionality. In another implementation, framework 200 may include, in new requirement 1112, only one of the first document functionality or the second document functionality based on some criteria (e.g., most recently modified functionality is included, functionality that does not use global variables is included, least complex functionality (e.g., based on a cyclomatic complexity measure) is included, etc.). In yet another implementation, the framework may include, in new requirement 1112, only the first document functionality, of requirement 1114. In still yet another implementation, an interface for merging two requirement objects is presented to the user. The interface may indicate differences between the two requirement objects. The user may use the interface to determine and/or to specify how to resolve the indicated differences.

Example 1120 also illustrates an addition operation. As shown, the addition operation may include adding a functionality 1126 to a requirement 1124 to create a new requirement 1122. The framework may add functionality 1126 to requirement 1124 to create new requirement 1122. Assume, for example, that requirement 1124 includes a document functionality and that functionality 1126 is a different document functionality. In one implementation, because requirement 1124 already includes the document functionality, the framework may replace the document functionality, of requirement 1124, with functionality 1126 to create new requirement 1122.

Example 1130 illustrates a comparison operation. As shown, the comparison operation may include determining whether a requirement 1132 matches a requirement 1134. Requirements framework 200 may perform the comparison operation when a user provides instruction to combine one or more collections of requirements and/or one or more requirements, as described above in reference to FIG. 10. For example, requirements framework 200 may only add requirement 1132 to a collection of requirements when results of one or more comparison operations indicate that the collection of requirements does not already include a different requirement (e.g., requirement 1134) that matches requirement 1132.

A framework may store rules that specify when requirement 1132 matches requirement 1134. For example, in one implementation, the rules may specify that requirement 1132 matches requirement 1134 when requirement 1132 and requirement 1134 include the same functionalities and the same properties (e.g., same versions of the same functionalities and the same properties). In another implementation, the rules may specify that requirement 1132 matches requirement 1134 when one or more particular properties of the properties included in requirement 1132 match one or more particular properties of the properties included requirement 1134. In yet another implementation, the rules may specify that requirement 1132 matches requirement 1134 when one or more particular functionalities of the functionalities functionality included in requirement 1132 match (e.g., a syntactic or semantic match) one or more particular functionalities of the functionalities included in requirement 1134.

In still yet another implementation, the rules may specify that requirement 1132 matches requirement 1134 when an identifier and/or a version of requirement 1132 are equal to an identifier and/or a version of requirement 1134, respectively. In still yet another implementation, the rules may specify that requirement 1132 matches requirement 1134 when a verification rule of requirement 1132 is the same as a verification rule of requirement 1134. In an embodiment, a checksum mechanism (e.g., MD5) may be used to implement the comparison.

Examples of Copying Requirements

Figure 12:
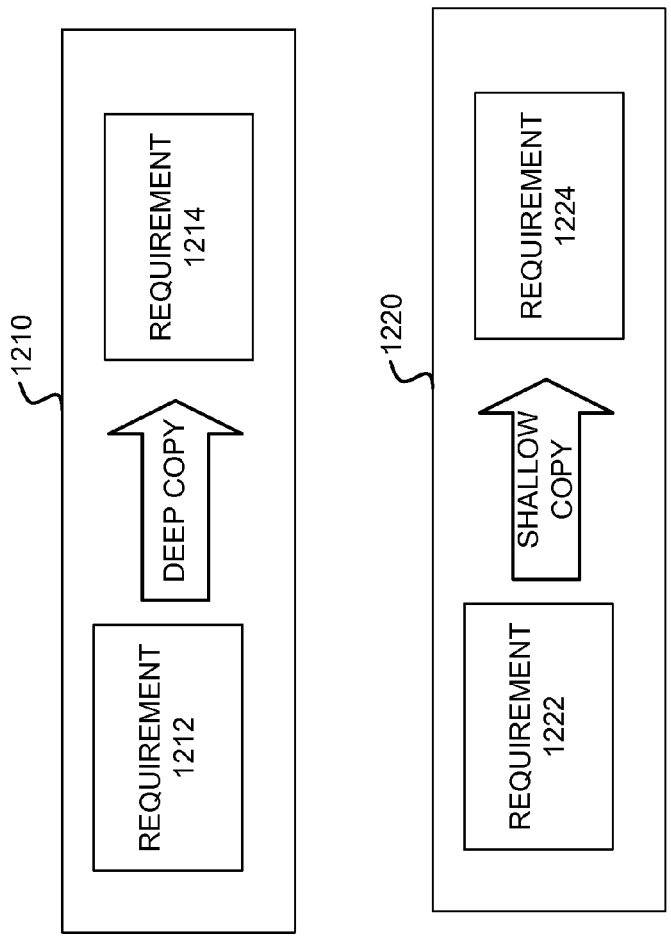
FIG. 12 illustrates examples of copying requirements.

FIG. 12 illustrates examples 1210 and 1220 of copying requirements. A user may copy a requirement to use, for example, functionalities and/or properties of an existing requirement object in a new requirement object. A user may define different types of operations that may be used to copy a requirement. The operations may include, for example, a deep copy operation and/or a shallow copy operation. The user may define rules for the deep copy operation and, different, rules for the shallow copy operation. A framework may store the rules for the deep copy operation and/or the shallow copy operation.

Example 1210 illustrates a deep copy operation. The deep copy operation may include copying all functionalities, properties, and/or other elements of a requirement 1212, except those explicitly specified, to be excluded, in a definition of the deep copy operation to form a requirement 1214. For example, the definition of the deep copy operation may specify that a verifying functionality of an existing requirement being copied (e.g., requirement 1212) is not to be included in a new requirement being created (e.g., requirement 1214) when the deep copy operation is performed. Accordingly, requirement 1214 may include all functionalities and properties of requirement 1212 except the verifying functionality of requirement 1212. In another implementation, the deep copy operation may include copying a hierarchy of requirements, requirement objects, etc. For example, the definition of the deep copy operation may specify that all levels of hierarchy that is a level below a particular requirement object being copied are to be included in a new requirement object being created.

Example 1220 illustrates a shallow copy operation. The shallow copy operation may include copying only functionalities, properties, and/or other elements of requirement 1222 that are explicitly specified to be included in a definition of the shallow copy operation, to form requirement 1224. For example, the definition of the shallow copy operation may specify that only descriptions of the functionalities of an existing requirement being copied (e.g., requirement 1222) should be included in a new requirement being created (e.g., requirement 1224) when the shallow copy operation is performed. Accordingly, requirement 1224 may include only descriptions of functionalities of requirement 1222. In another implementation, the shallow copy operation may only create an object with default properties and/or functionalities. In yet another implementation, the shallow copy may create a new requirement object that references the copied reference object.

Example Distributed Network

FIG. 13 illustrates an example of a distributed network 1300 in which systems and/or methods described herein may be implemented. Referring to FIG. 13, environment 1300 may contain various entities including device 100, target environment 1310, service provider 1320, cluster 1330, and network 1340. Note that the distributed environment 1300 is just one example of a distributed environment that may be used with embodiments of the invention. Other distributed environments that may be used with embodiments of the invention may contain more entities, fewer entities, entities in arrangements that differ from the arrangement illustrated in FIG. 13, and so on. Moreover, the distributed environments may be configured to implement various "cloud computing" frameworks.

Details of device 100 were described above with respect to FIG. 1. In distributed environment 1300, device 100 may be configured to, among other things, exchange information (e.g., data) with other entities in network 1340 (e.g., target environment 1310, service provider 1320, and cluster 1330). Device 100 may interface with the network 1340 via communication interface 180.

Target environment 1310 may be configured to execute and/or interpret a compiled version of a model which may be generated in or otherwise available to the distributed environment 1300. The network 1340 may include a communication network capable of exchanging information between the entities in the network 1340. The network 1340 may include digital and/or analog aspects. The information may include machine-readable information having a format that may be adapted for use, for example, in the network 1340 and/or with one or more entities in the network 1340. For example, the information may be encapsulated in one or more packets that may be used to transfer the information through the network 1340.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.10, 802.11, etc.

Network 1340 may comprise various network devices, such as gateways, routers, switches, firewalls, servers, repeaters, address translators, etc. Portions of network 1340 may be wired (e.g., using wired conductors, optical fibers, etc.) and/or wireless (e.g., using free-space optical (FSO), radio frequency (RF), acoustic transmission paths, etc.). Portions of network 1340 may include a substantially open public network, such as the Internet. Portions of network 1340 may include a more restricted network, such as a private corporate network or virtual private network (VPN). It should be noted that implementations of networks and/or devices operating on networks described herein are not limited with regards to, for example, information carried by the networks, protocols used in the networks, and/or the architecture/configuration of the networks.

Service provider 1320 may include logic that makes a service available to another entity in distributed environment 1300. Service provider 1320 may also include a server operated by, for example, an individual, a corporation, an educational institution, a government agency, and so on, that provides one or more services to a destination, such as device 100. The services may include software containing computer-executable instructions that implement one or more embodiments of the invention or portions thereof, and may be executed, in whole or in part, by (1) a destination, (2) service provider 1320 on behalf of the destination, or (3) some combination thereof.

For example, in an embodiment, service provider 1320 may provide one or more subscription-based services that may be available to various customers. The services may be accessed by a customer via network 1340. The customer may access the services using a computer system, such as device 100. The services may include services that implement one or more embodiments of the invention or portions thereof. Service provider 1320 may limit access to certain services based on, e.g., a customer service agreement between the customer and service provider 1320.

The service agreement may allow the customer to access the services that may allow the customer to build, execute, and/or analyze a model for a design, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources and/or network bandwidth used.

Cluster 1330 may include a number of units of execution (UEs) 1335 that may perform processing of one or more embodiments of the invention or portions thereof on behalf of device 100 and/or another entity, such as service provider 1320. UEs 1335 may reside on a single device or chip or on multiple devices or chips. For example, UEs 1335 may be implemented in a single ASIC or in multiple ASICs. Likewise, UEs 1335 may be implemented in a single computer system or multiple computer systems. Other examples of UEs 1335 may include FPGAs, CPLDs, ASIPs, processors, multiprocessor systems-on-chip (MPSoCs), graphic processing units, microprocessors, etc. UEs 1335 may be configured to perform operations on behalf of another entity. Service provider 1320 may configure cluster 1330 to provide, for example, the above-described services to computing device 100 on a subscription basis (e.g., via a web service).

CONCLUSION

A technical computing environment (TCE) may provide an environment that may enable a user to create designs of systems, simulate systems, perform advanced analysis, visualize data, develop algorithms, etc. The TCE may be a graphical-based modeling environment, a textual-based modeling environment, and/or a hybrid modeling environment (e.g., a combination of graphical and textual modeling environments).

The TCE may include hardware and/or software based logic that provides a computing environment that allows operators to perform tasks related to disciplines, such as, but not limited to, mathematics, science, engineering, medicine, business, etc., more efficiently than if the tasks were performed in another type of computing environment, such as an environment that required the operator to develop code in a conventional programming language, such as C++, C, Fortran, Pascal, etc. The TCE may connect a model with code that is executing externally (e.g., on a target processor) to enable a processor-in-the-loop configuration, hardware-in-the-loop configuration, software-in-the-loop configuration, or model-in-the-loop configuration. The executable code may generate variable information that may be stored in a logical workspace and/or presented for display via a user interface associated with the logical workspace.

The TCE may automatically generate code from at least part of a design. The code may be software code (e.g., C+, C++, SystemC, etc.), hardware code (e.g., hardware description language (HDL), etc.), or some combination thereof.

Examples of TCEs that may be modified to incorporate one or more embodiments of the invention include, but are not limited to, the MATLAB®, Simulink®, Stateflow®, Simscape™, and SimEvents®, software applications which are available from The MathWorks, Inc., Natick, Mass.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica and Dymola from Dynasim AB; VisSim from Visual Solutions; SoftWIRE from Measurement Computing Corporation; WiT from DALSA Coreco; VEE Pro and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.;

Virtuoso from Cadence Design Systems, Inc.; Rational Rose, Rhapsody, and Tau from International Business Machines (IBM), Inc.; SCADE from Esterel Technologies; the Eclipse development platform from the Eclipse Foundation; MagicDraw from No Magic, Inc.; CoWare from CoWare, Inc.; and Ptolemy from the University of California at Berkeley.

A design may be, for example, a time-based graphical block diagram model, a state transition diagram, a discrete event model, an activity diagram, a UML diagram, a sequence diagram, a data flow model, or some other type of model or diagram. The design may be configured to represent a system, such as a physical system. The design may be graphical, textual, or some combination of graphical and textual. The system represented by the design may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing systems, and a stock market.

The system represented by the design may have various execution semantics that may be represented in model as a collection of modeling elements, often referred to as blocks. A block may generally refer to a portion of functionality that may be used in the design. The block may be graphically represented. However, the block does not necessarily need to be represented graphically. For example, the block may be represented textually or stored in some form of internal representation. Also, a particular visual depiction used to represent the block, for example in a graphical block diagram, may be an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

The foregoing description of implementations provides illustration and description, but is not intended to be exhaustive or to limit the invention to the precise form disclosed. Modifications and variations are possible in light of the above teachings or may be acquired from practice of the invention.

A requirement element may represent a requirement object created by using object-oriented programming techniques or a requirement that is not object-oriented based. For example, requirement element may include one or more other types of data structures that are not object-oriented based.

For example, while series of blocks have been described with regard to processes of FIGS. 11-13, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions, described herein, may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    interacting with a requirement element using a requirements framework,
        the requirement element being created based on a requirement class for a requirement of the requirements framework,
        the interacting being performed by a computing device,
        the interacting including modifying the requirement element or creating a new requirement element,
            modifying the requirement element including adding, based on a requirement-based operator, one or more functionalities from another requirement element to the requirement element;
    determining whether the requirement element is applicable to a design based on a type of the design and applicability criteria associated with the requirement element,
        the design relating to a dynamic model,
        the determining whether the requirement element is applicable to the design being performed by the computing device;
    determining whether the design complies with the requirement element after determining whether the requirement element is applicable to the design,
        the determining whether the design complies with the requirement element being performed by the computing device; and
    producing a result based on determining whether the design complies with the requirement element,
        the producing the result being performed by the computing device.

2. The method of claim 1, where the requirement-based operator specifies rules for selecting the one or more functionalities from the other requirement element.

3. The method of claim 1, further comprising:
    creating the requirements framework,
        where creating the requirements framework includes defining design criteria,
        where the design criteria specifies one or more characteristics of one or more designs, and
        where the design complies with the design criteria; and
    creating the requirement element.

4. The method of claim 1,
where the design complies with design criteria that specifies one or more characteristics of one or more designs.

5. The method of claim 1, where determining whether the requirement element is applicable to the design includes:
determining, using an adaptor associated with the requirements framework, whether the requirement element is applicable to the design.

6. The method of claim 5, where determining whether the requirement element is applicable to the design includes:
determining, using a verifying functionality of at least one of the adaptor or the requirement element, whether the design complies with the requirement element, and where producing the result includes:
producing the result using a reporting functionality of the at least one of the adaptor or the requirement element.

7. The method of claim 1, further comprising:
determining the type of the design.

8. The method of claim 1, further comprising:
obtaining the applicability criteria associated with the requirement element.

9. One or more non-transitory computer-readable media storing instructions, the instructions comprising:
one or more instructions which, when executed by a computing device, cause the computing device to:
interact with a requirement element using a requirements framework,
the requirement element being created based on a requirement class for a requirement of the requirements framework,
the one or more instructions to interact with the requirement element including one or more instructions to modify the requirement element,
the one or more instructions to modify the requirement element including one or more instructions to add, based on a requirement-based operator, one or more functionalities from another requirement element to the requirement element;
determine whether the requirement element is applicable to a design based on a type of the design and applicability criteria associated with the requirement element, the design relating to a dynamic model;
determine whether the design complies with the requirement element after determining whether the requirement element is applicable to the design; and
produce a result based on determining whether the design complies with the requirement element.

10. The one or more non-transitory computer-readable media of claim 9, where the instructions further comprise:
one or more instructions to create the requirement element.

11. The one or more non-transitory computer-readable media of claim 9, where the one or more instructions to determine whether the requirement element is applicable to the design include:
one or more instructions to determine, using an adaptor associated with the requirements framework, whether the requirement element is applicable to the design, where the adaptor provides an additional functionality to the requirement element.

12. The one or more non-transitory computer-readable media of claim 11, where the one or more instructions to determine whether the design complies with the requirement element include:
one or more instructions to determine, using a verifying functionality of the adaptor, whether the design complies with the requirement element, and
where the one or more instructions to produce the result include:
one or more instructions to produce the result using a reporting functionality of the adaptor.

13. The one or more non-transitory computer-readable media of claim 9, where the one or more instructions to determine whether the design complies with the requirement element include:
one or more instructions to determine, using a verifying functionality of the requirement element, whether the design complies with the requirement element, and where the one or more instructions to produce the result include:
one or more instructions to produce the result using a reporting functionality of the requirement element.

14. The one or more non-transitory computer-readable media of claim 13, where the reporting functionality produces a result based on an output of the verifying functionality.

15. The one or more non-transitory computer-readable media of claim 9, where the instructions further comprise:
one or more instructions to determine the type of the design; and
one or more instructions to obtain the applicability criteria associated with the requirement element.

16. The one or more non-transitory computer-readable media of claim 9, where the instructions further comprise:
one or more instructions to define design criteria,
where the design criteria specifies one or more characteristics of one or more designs,
where the design complies with the design criteria.

17. A system comprising:
a memory to store instructions; and
a processor to execute the instructions in the memory to:
interact with a requirement element using a requirements framework,
the requirement element being created based on a requirement class for a requirement of the requirements framework,
when interacting with the requirement element, the processor is to modify the requirement element or create a new requirement element,
when modifying the requirement element, the processor is to:
subtract, based on a first requirement-based operator, one or more functionalities from the requirement element, or
add, based on a second requirement-based operator, one or more other functionalities from another requirement element to the requirement element;
determine whether the requirement element is applicable to a design based on a type of the design and applicability criteria associated with the requirement element,
the design relating to a dynamic model;
determine whether the design complies with the requirement element after determining whether the requirement element is applicable to the design; and
produce a result based on determining whether the design complies with the requirement element.

18. The system of claim 17, where the processor is further to:
create the requirement element.

19. The system of claim 17, where, when determining whether the requirement element is applicable to the design, the processor is to:

determine, using a first functionality of the requirement element, whether the design complies with the requirement element, and where, when producing the result, the processor is to:
produce the result using a second functionality of the requirement element.

20. The system of claim 17, where the processor is to:
determine the type of the design.

* * * * *